(12) United States Patent
Goto et al.

(10) Patent No.: US 9,008,431 B2
(45) Date of Patent: Apr. 14, 2015

(54) CHARACTER STRING EXTRACTION METHOD AND CHARACTER STRING EXTRACTION DEVICE

(75) Inventors: Masanori Goto, Hyogo (JP); Toru Yonezawa, Hyogo (JP); Motoko Kuroiwa, Hyogo (JP)

(73) Assignee: Glory Ltd., Himeji-shi (JP)

( * ) Notice: Subject to any disclaimer, the term of this patent is extended or adjusted under 35 U.S.C. 154(b) by 18 days.

(21) Appl. No.: 14/002,933

(22) PCT Filed: Mar. 4, 2011

(86) PCT No.: PCT/JP2011/055042
§ 371 (c)(1),
(2), (4) Date: Sep. 3, 2013

(87) PCT Pub. No.: WO2012/120587
PCT Pub. Date: Sep. 13, 2012

(65) Prior Publication Data
US 2013/0343652 A1    Dec. 26, 2013

(51) Int. Cl.
*G06K 9/18* (2006.01)
*G06K 9/00* (2006.01)
*G06K 9/32* (2006.01)
*G06K 9/34* (2006.01)

(52) U.S. Cl.
CPC .............. *G06K 9/18* (2013.01); *G06K 9/00442* (2013.01); *G06K 9/3233* (2013.01); *G06K 9/342* (2013.01)

(58) Field of Classification Search
USPC ................................................ 382/135, 182
See application file for complete search history.

(56) References Cited

U.S. PATENT DOCUMENTS

| 5,915,039 | A | 6/1999 | Lorie et al. |
| 6,185,338 | B1 | 2/2001 | Nakamura |
| 8,139,862 | B2 * | 3/2012 | Shimodaira .................... 382/182 |
| 2010/0172580 | A1 * | 7/2010 | Takenouchi et al. .......... 382/165 |
| 2012/0269438 | A1 * | 10/2012 | Kutsumi ....................... 382/182 |
| 2013/0322758 | A1 * | 12/2013 | Matsushita ................... 382/182 |

FOREIGN PATENT DOCUMENTS

| EP | 1 437 692 B1 | 3/2006 |
| JP | 4-104385 A | 4/1992 |
| JP | 6-301814 A | 10/1994 |
| JP | 7-99532 B2 | 10/1995 |

(Continued)

OTHER PUBLICATIONS

Obeid, H. R., et al., "License Plate Localization in ALPR Systems", Innovations in Information Technology, 4th International Conference, *IEEE*, Nov. 18, 2007, pp. 486-490.

(Continued)

*Primary Examiner* — John Strege
(74) *Attorney, Agent, or Firm* — Foley & Lardner LLP

(57) ABSTRACT

In a character string extraction method, a character portion, a rim portion, a character frame, and a character string frame are set, a feature value of each image in the character portion and the rim portion is calculated for each character frame, a character string frame evaluation value is calculated based on the feature value for the character string frame, a position of the character string frame is moved on the paper sheet image, and the image in the character portion is extracted by using the character string frame at a position at which the character string frame evaluation value reaches a maximum.

12 Claims, 18 Drawing Sheets

(56) References Cited

FOREIGN PATENT DOCUMENTS

| JP | 9-259219 A | 10/1997 |
|---|---|---|
| JP | 2010-225013 A | 10/2010 |

OTHER PUBLICATIONS

Rodner, E., et al., "Difference of Boxes Filters Revisited: Shadow Suppression and Efficient Character Segmentation", The Eighth IAPR Workshop on Document Analysis Systems, IEEE, Sep. 16, 2008, pp. 263-269.

Vonikakis, V., et al., Adaptive Document Binarization, *A human vision approach*, $2^{nd}$ International Conference on Computer Vision Theory and Applications VISAPP, Mar. 8, 2007, pp. 1-6.

Brickman, N. F., et al., "Word Autocorrelation Redundancy Match (WARM) Technology", IBM Journal of Research and Development, vol. 26, No. 6, Nov. 1, 1982, pp. 681-686.

Supplementary European Search Report dated Jul. 31, 2014, 8 pgs.

\* cited by examiner

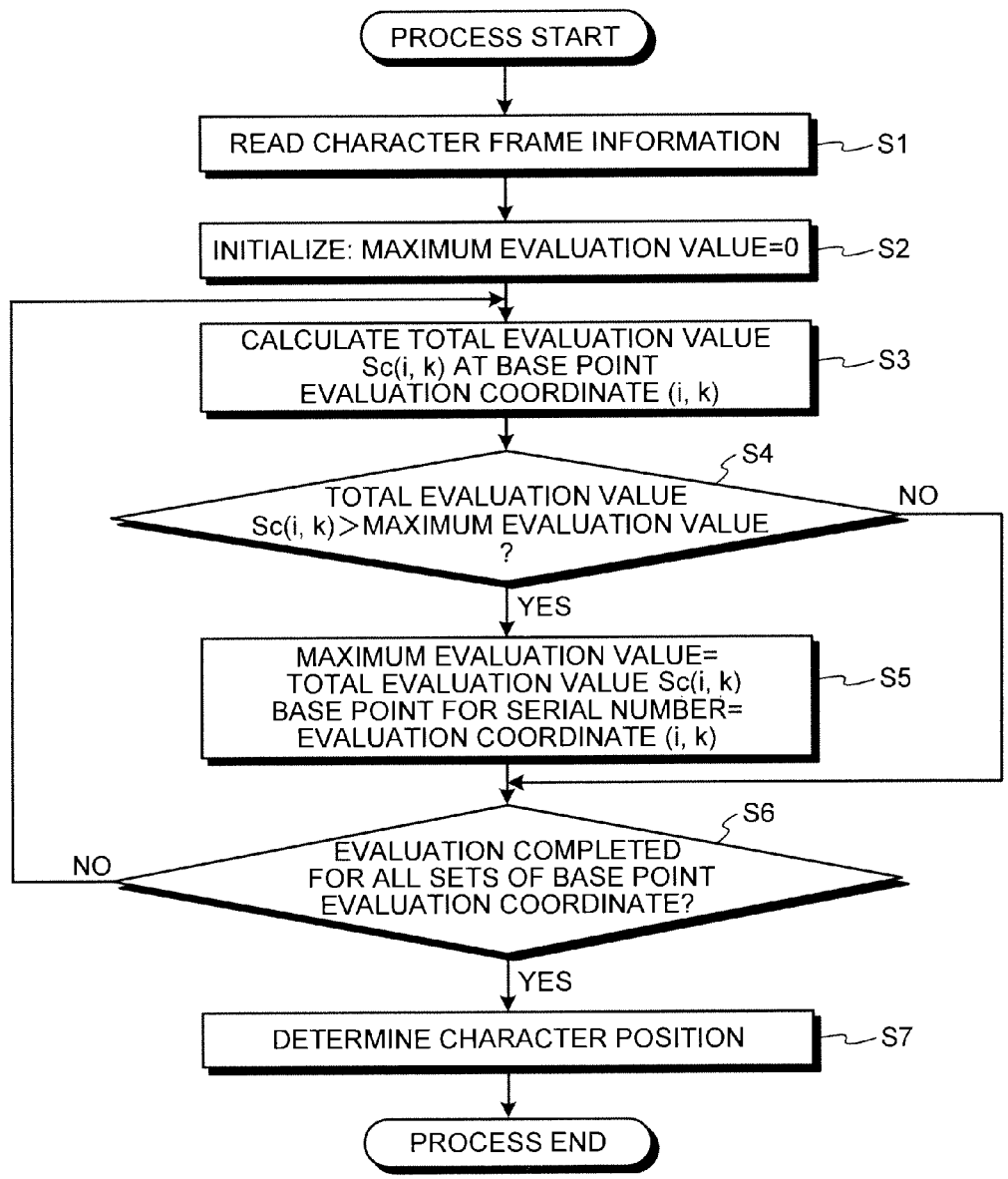

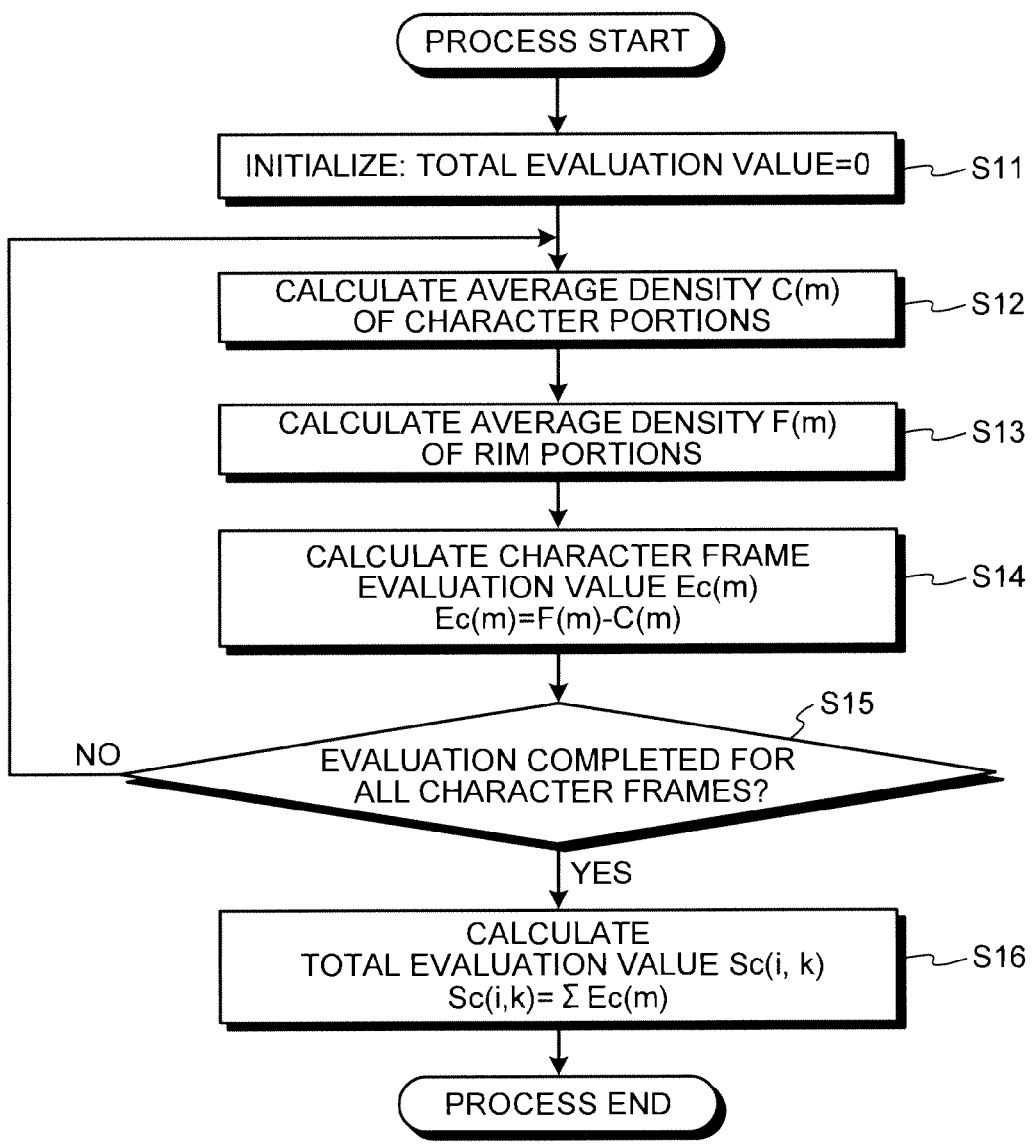

FIG.17

| EXAMPLE | FRAME TYPE | SHAPE OF CHARACTER STRING FRAME | EVALUATION FORMULA |
|---|---|---|---|
| (a) | CHARACTER FRAME | | CHARACTER FRAME EVALUATION VALUE = (RIM PORTION DENSITY AVERAGE VALUE − CHARACTER PORTION DENSITY AVERAGE VALUE) |
| (b) | CHARACTER FRAME + MARGIN FRAME | | MARGIN FRAME EVALUATION VALUE = −\|RIM PORTION DENSITY AVERAGE VALUE − CHARACTER PORTION DENSITY AVERAGE VALUE\| |
| (c) | CHARACTER FRAME + MULTIPLE DIGIT FRAME | | MULTIPLE-DIGIT FRAME EVALUATION VALUE = −\|RIM PORTION DENSITY AVERAGE VALUE − CHARACTER PORTION DENSITY AVERAGE VALUE\| |
| (d) | CHARACTER FRAME + TOP-AND-BOTTOM FRAME | | TOP-AND-BOTTOM FRAME EVALUATION VALUE = −\|TOP CHARACTER PORTION DENSITY AVERAGE VALUE − BOTTOM CHARACTER PORTION DENSITY AVERAGE VALUE\| |
| (e) | CHARACTER FRAME + PATTERN FRAME | | PATTERN FRAME EVALUATION VALUE = (RIM PORTION DENSITY AVERAGE VALUE − CHARACTER PORTION DENSITY AVERAGE VALUE) |

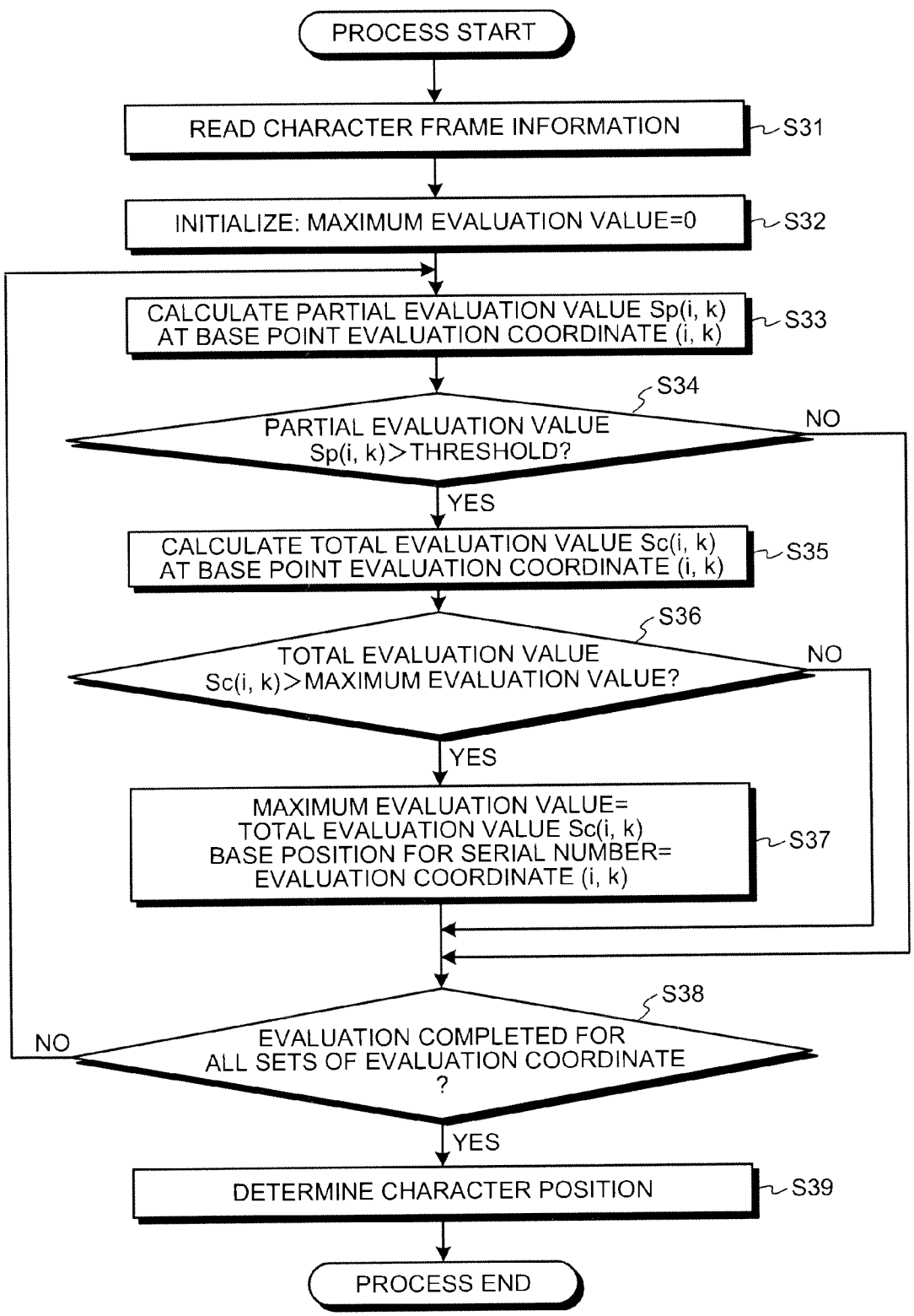

CHARACTER STRING EXTRACTION METHOD AND CHARACTER STRING EXTRACTION DEVICE

TECHNICAL FIELD

The present invention relates to a character string extraction method and a character string extraction device that can be used to extract a character string from a paper sheet image that is obtained by capturing a paper sheet so as to perform character recognition on the extracted character string.

BACKGROUND ART

A paper sheet such as a banknote, a check, a draft, and a gift coupon has a character string printed thereon as an identification number to identify the paper sheet. For a banknote, this identification number is called a serial number. If, for example, a counterfeit banknote is found, a bank can use this serial number to check whether this counterfeit banknote was processed in a transaction performed within the bank. There is a need, for financial institutions and the like, to automatically perform character recognition on serial numbers and enter recognized serial numbers into a database in order to manage banknotes in transactions.

To build the database of banknotes from their serial numbers, character recognition needs to be accurately performed on the serial numbers that are to be entered as data. The character recognition is performed by using an image of a serial number extracted from a banknote image obtained by capturing a banknote. To achieve the character recognition, the position of a character string, which is the serial number, needs to be identified on the banknote image to accurately extract the serial number image. As a technique of extracting a character string from an image, Patent Document 1 discloses a method of extracting only a character string image by distinguishing the character string from its background based on color information. More specifically, a color image of a banknote is used, and pixels indicating colors of the background are removed from an image of a region containing the character string to extract the character string image.

Patent Document 2 discloses a method of extracting an image of a character string by using differences among densities of characters and their background. More specifically, this method includes generating a histogram by projecting densities of an image containing the character string, and extracting a region having a density projection value that exceeds a predetermined threshold value. This threshold value is adjusted such that the width of the extracted region coincides permissibly with a predetermined width of a character string image. This allows separation of the image of the serial number from its background or stains.

Patent Document 3 discloses a method of extracting individual characters, one by one, in a character string by scanning the character string through a character extraction window and detecting the position of each character. More specifically, the character extraction window has a central region that matches the size of the smallest one of the characters in the character string, a strip-shaped surrounding region that surrounds the central region and matches the size of the largest character, and a strip-shaped background region that surrounds the surrounding region taking into account the spaces between characters. The character extraction window is moved on the binarized character string image. When the total numbers of pixels for characters in the background region and the surrounding region satisfies a predetermined condition, and the length of the projected characters in the central region satisfies a predetermined value, this position is detected as a position of a character and a character image of each character is extracted from the detected position.

CONVENTIONAL ART DOCUMENTS

Patent Documents

[Patent Document 1] Japanese Patent Application Laid-open No. 2010-225013
[Patent Document 2] Japanese Patent Application Laid-open No. H6-301814
[Patent Document 3] Japanese Patent Publication No. H7-99532

DISCLOSURE OF INVENTION

Problems to be Solved by the Invention

In the method disclosed in Patent Document 1, which uses color information, a character string may not be distinguished from its background if the character string and its background are printed in similar colors. Banknotes come in different sizes, colors, patterns, and the like among different issuing countries and among different denominations. Some banknotes have serial numbers printed in a color similar to the background. The method cannot deal with such banknotes.

In the method according to Patent Document 2, which uses the histogram of the density of the character string, the character string may not be accurately extracted if any characters other than the target of the character recognition are printed near the target character string or if there is some design or pattern in the background of the target character string. Some banknotes have information relating to the issuing country, denomination, and the like printed thereon, other than the serial number. A design or a pattern can be placed behind the serial number. A value on the histogram can change where any character or background pattern other than the serial number is present, and therefore the extraction of the serial number can be adversely affected.

More specifically, for example, a histogram indicating density distribution in a serial number region 101 in Y direction is shown in FIG. 20A. When a region that exceeds a shown threshold value h on this histogram is extracted, an image of a character string 103 only, which is not a target of extraction and is printed above a serial number 102, is extracted. Even if the threshold is set lower to include the serial number 102, an image that contains the non-target character string 103 and the serial number 102, but not an image that contains the serial number 102 only, would be extracted. If the region is extracted in this manner, the character recognition of the serial number 102 cannot be accurately performed. In an alternative method, the height of the serial number region 101 in the Y direction can be reduced so that the non-target character string 103 would not be included in the region 101. The height may not be successfully reduced, due to an error in the position at which the serial number 102 is printed. As shown in FIG. 20B, there can be influence of a pattern when the pattern is placed in the background of the serial number 102. On the histogram indicating the density distribution of the serial number region 101 in the X direction, the position of each character in the serial number 102 cannot be accurately identified by merely extracting a region that exceeds the shown threshold value h.

In the method according to Patent Document 3, a character extraction window having a size, of which corresponds to that of a single character, is used. In a case as shown in FIG. 20B where there is a small difference between the densities of the characters and the background, the position of each character cannot be accurately detected, and the characters therefore cannot be extracted.

The present invention has been conceived to solve the above problems in the conventional technologies. It is an object of the present invention to provide a character string extraction method and a character string extraction device, with which an image of each character in a character string can be accurately extracted by identifying the positions of characters in the character string even when a character string that is not a target of processing is printed near the target character string or when a design or a pattern is present in the background of the target character string.

Means to Solve the Problems

To solve the above problems and achieve the object, a character string extraction method according to an aspect of the present invention, in which a character frame is set on a paper sheet image obtained by capturing a paper sheet on which a character string is printed or typed, and an image of the character string is extracted, includes setting a character portion that is a region including each character in the character string, a rim portion that is a surrounding region adjacent to and around the character portion, a character frame that is a combination of the character portion and the rim portion, and a character string frame that includes all the character frames; calculating feature values of each image in the character portion and the rim portion for each character frame; calculating a character string frame evaluation value based on the feature values for the character string frame; moving a position of the character string frame on the paper sheet image; and extracting an image in the character portion by using the character string frame at a position at which the character string frame evaluation value reaches a maximum.

According to another aspect of the present invention, in the above character string extraction method, the character string frame is set in accordance with a type of the paper sheet.

According to still another aspect of the present invention, in the above character string extraction method, the feature values are average densities of all pixels in each portion.

According to still another aspect of the present invention, in the above character string extraction method, when setting the character string frame, the character portion and the rim portion are set not only for the characters in the character string but also for an other portion of the character string, the other portion is adjacent to the character string. When calculating the evaluation value, a value based on the feature values of the character portion and the rim portion that are set in the margin portion is subtracted from the character string frame evaluation value, and calculated result is adopted as a character string frame evaluation value.

According to still another aspect of the present invention, in the above character string extraction method, when setting the character string frame, the character portion and the rim portion are set not only for the characters in the character string but also for non-extraction-target character that is printed on the paper sheet, and when calculating the evaluation value, a value based on feature values of the character portion and the rim portion that are set in the non-extraction-target character is subtracted from the character string frame evaluation value, and calculated value is adopted as a character string frame evaluation value.

According to still another aspect of the present invention, in the above character string extraction method, when setting the character string frame, the character portion and the rim portion are set not only for the characters in the character string but also for non-extraction-target character or a pattern printed on the paper sheet in a predetermined positional relationship with the character string, and when calculating the evaluation value, a value based on a feature values of the character portion and the rim portion that are set for the non-extraction-target character or the pattern is added to the character string frame evaluation value, and calculated value is adopted as a character string frame evaluation value.

According to still another aspect of the present invention, in the above character string extraction method, when extracting the image, an image in the character portion set for the other portion adjacent to the character string, the non-extraction-target character, or the pattern is not extracted.

According to still another aspect of the present invention, in the above character string extraction method, further includes calculating feature values where the character portion and the rim portion are moved in a predetermined direction with respect to the character string frame for a predetermined number of pixels, while fixing the position of the character string frame set on the paper sheet image; and, if the character string frame is fixed at the position and the character string frame evaluation value after moving the character portion and the rim portion is greater than the character string frame evaluation value before the moving, the character string frame evaluation value after the moving is adopted as the character string frame evaluation value, and when extracting the image, an image in the character portion after the moving is determined as an extraction target.

According to still another aspect of the present invention, the above character string extraction method further includes a first partial evaluation process in which all steps except the step for extracting the image are performed with focusing some of the character frames included in the character string frame, and the feature value and the character string frame evaluation value are calculated; and, the steps for calculating the feature value and the evaluation value, and for extracting the image are performed with focusing all the character frames only at the position of the character string frame for which the character string frame evaluation value calculated in the first partial evaluation process is ranked among a predetermined number of character string frame evaluation values from the maximum.

According to still another aspect of the present invention, the above character string extraction method further includes a second partial evaluation process in which the feature value and the character string frame evaluation value are calculated with focusing some of the character frames included in the character string frame; and, the steps for calculating the feature value and the evaluation value, and for extracting the image are performed with focusing all the character frames only at the position of the character string frame for which the character string frame evaluation value calculated in the second partial evaluation process exceeds a predetermined threshold value.

A character string extraction device according to still another aspect of the present invention that receives a paper sheet image obtained by capturing a paper sheet on which a character string is printed or typed, sets a character string frame thereon, and thereby extracts an image of the character string, includes a skew correction unit that corrects a skew of the paper sheet image when the paper sheet image is skewed; a partial region extraction unit that extracts a region that includes the character string from the paper sheet image or the paper sheet image corrected by the skew correction unit; an evaluation value calculation unit that sets a region that includes each character in the character string as a character portion, a surrounding region adjacent to and around the character portion as a rim portion, the character portion combined with the rim portion as a character frame, and a region including all the character frames as a character string frame, calculates feature values of each image in the character portion and the rim portion while moving a position of the character string frame, and calculates a character string frame evaluation value based on the feature values of the rim portion and the character portion calculated at different positions; and a character position determining unit that determines, as a region for extracting an image, the character portion of the character string frame for which the character string frame evaluation value reaches a maximum.

Advantages of the Invention

According to an aspect of the present invention, a character portion and a rim portion are set for each character in a character string printed on a paper sheet. While changing the position of the character string frame that includes the character portions and the rim portions, character string frame evaluation values are calculated from all the character portions and the rim portions of the character string frame. Then, the character string frame evaluation values are evaluated, relative to one another. The position of the character string frame is thereby determined, and an image of each character in the character portion is extracted. Consequently, influence of a non-extraction-target character string, a background pattern, and the like can be reduced, and the image of each character in the character string can be accurately extracted.

According to another aspect of the present invention, the character portion, the rim portion, and the character string frame are set in accordance with the type of a processing target paper sheet. A suitable character string frame therefore can be set for each paper sheet, and the image of each character in the character string can be accurately extracted.

According to still another aspect of the present invention, the character string frame evaluation value is calculated based on an average brightness of all pixels included in the character portions and an average brightness of all pixels in the rim portions. By using a gray-scale image of the paper sheet, the position of the character string can be accurately identified.

According to still another aspect of the present invention, the character portions and the rim portions are set for a character string and also for a margin portion adjacent to the character string. An evaluation formula is set such that, when the position of the character string is falsely recognized, the evaluation value is degraded. The position of the character string therefore can be accurately identified, without falsely recognizing a digit-shifted position for an actual position.

According to still another aspect of the present invention, the character portion and the rim portion are set to coincide with the non-extraction-target character string. The evaluation formula is set such that, if the non-extraction-target character string is likely to be falsely recognized as an extraction target character string, the evaluation value is degraded. Consequently, the position of the character string therefore can be accurately identified, without falsely recognizing the non-extraction-target character string as the extraction target character string.

According to still another aspect of the present invention, the character portion and the rim portion are set not only for the character string, but also for a feature portion that serves as a clue to identify the position of the character string. The evaluation formula is set such that, when the position of the character string is accurately identified, the evaluation value is increased. The position of the character string therefore can be accurately identified.

According to still another aspect of the present invention, whether an image in the character portion should be extracted can be set for each character portion, and therefore various types of character portions and rim portions can be set and used in accordance with the intended use.

According to still another aspect of the present invention, for the evaluation, the positions of the character portion and the rim portion are moved pixel by pixel with respect to the character string frame, while the position of the character string frame is being fixed. Even if the images of the characters in the character string are not vertically aligned or equally spaced on the paper sheet image due to a displacement of printed positions of the characters or a skew of the image, the position of each character can still be accurately identified.

According to still another aspect of the present invention, the character string frame evaluation value is calculated by using only some of the character portions and the rim portions in the character string frame. After the position of the character string frame that is to be evaluated on the image is thereby narrowed down, the detail evaluation is made by using all the character portions and the rim portions in the character string frame at this position only. Consequently, the entire processing amount can be reduced, and the processing speed can be increased.

According to still another aspect of the present invention, the character string frame evaluation value is calculated by using only some of the character portions and the rim portions in the character string frame. Only when this value satisfies the predetermined threshold, the detail evaluation is made by using all the character portions and the rim portions in the character string frame. Consequently, the entire processing amount can be reduced, and the processing speed can be increased.

According to still another aspect of the present invention, with the character string extraction device, the image of each character in the character string can be accurately extracted, while reducing influence of a non-extraction-target character string, a background pattern, or the like. This character string extraction device can be connected to a scanner or a paper sheet processing apparatus that generates a paper sheet image, or can be integrated in the paper sheet processing apparatus. Alternatively, the character string extraction device can be used for processing a paper sheet image stored in a storage device.

BRIEF DESCRIPTION OF DRAWINGS

FIG. 8 is a flowchart explaining a method for identifying of the position of a character on an image.

FIG. 9 is a flowchart explaining a method for calculating of a character string frame evaluation value.

FIG. 17 is a diagram showing examples of character string frames each including character frames and background frames.

FIG. 19 is a flowchart explaining another method for increasing the processing speed by using only some of the character frames.

BEST MODE(S) FOR CARRYING OUT THE INVENTION

Exemplary embodiments of a character string extraction method and a character string extraction device according to the present invention are explained in detail below with reference to the accompanying drawings.

The present invention is applicable to various paper sheets including gift coupons, checks, drafts, banknotes, and ledger sheets as long as the size and spacing of characters that are printed or typed on the surfaces of the paper sheets are provided. In the following embodiments, a banknote is adopted as a processing target. A character string of a serial number is printed as an identification number on a banknote. Extraction of an image of each character in the serial number from a banknote image obtained by capturing the banknote is now explained. More specifically, in the character string extraction device, the processing target is the image of banknote on which the serial number is printed. With the character string extraction method according to the present invention, the character string extraction device identifies the position of each character in the serial number on the banknote image, and performs an extraction process on an image of the serial number or the image of each character in the serial number. The following explanation includes extraction process of a serial number, a character string, or characters. The extraction process means a process for clipping a partial image from the banknote image such that the partial image includes the character string that is a serial number, or each character included in the character string, but not any other characters or any patterns or designs near the character string.

First Embodiment

Figure 1:
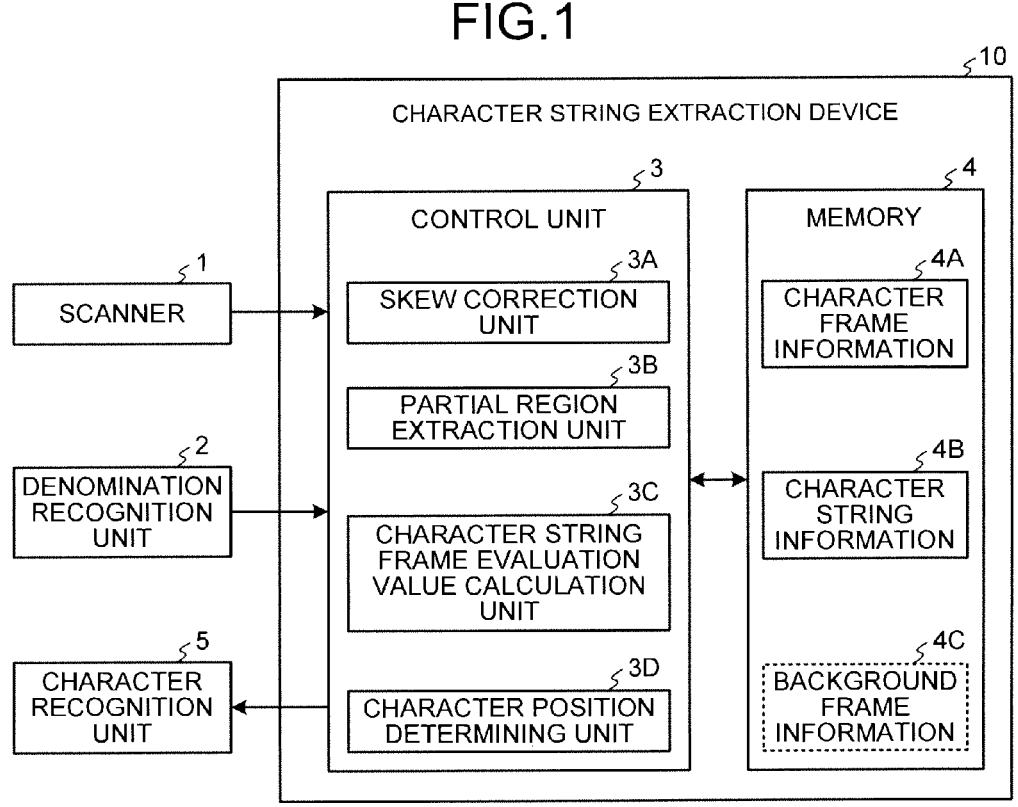
FIG. 1 is a diagram explaining an overall structure of a character string extraction device according to a first embodiment.

FIG. 1 is a block diagram of an overall structure of a character string extraction device 10 according to the present embodiment. FIG. 1 also shows examples of structural components connected to the character string extraction device 10 when it is used.

First, the structural components connected to the character string extraction device 10 when it is used are explained. The character string extraction device 10 is connected to a scanner 1, a denomination recognition unit 2, and a character recognition unit 5. The character string extraction device 10 receives a banknote image generated by the scanner 1, extracts the image of the a serial number or characters composing the serial number extracted from the banknote image based on denomination information received from the denomination recognition unit 2, and sends the image of the characters to the character recognition unit 5.

More specifically, the character string extraction device 10 receives the banknote image obtained by scanning a banknote from the scanner 1, and performs a process of extracting a partial image of a region that includes the serial number or each character of the serial number in the banknote image. The method for obtaining the banknote image, however, is not particularly limited as long as the banknote image that includes the serial number as the processing target can be obtained. For example, the banknote image can be inputted from other imaging devices such as a CCD camera, or can be read from a storage device or a storage medium such as a memory or a hard disk.

The character string extraction device 10, when extracting the image of the partial region that includes the serial number from the banknote image that includes the serial number, uses information such as the position at which the serial number is printed, the number of characters included in the serial number, the size of each character, and the like. The printed position of the serial number on the banknote, the number of characters therein, the size of the character, and the like are defined for each denomination. The character string extraction device 10 receives, from the denomination recognition unit 2, the denomination information regarding the banknote to be processed. For example, when a banknote image is of a banknote currently processed in the banknote handling apparatus, the scanner 1 generates the banknote image, and the denomination recognition unit 2 recognizes the denomination of the banknote by using the generated banknote image. Then, the character string extraction device 10 uses the banknote image received from the scanner 1 and the denomination information received from the denomination recognition unit 2. On the other hand, when a banknote image is stored in a storage device such as a memory, the character string extraction device 10 can use denomination information stored in association with the banknote image in the storage device, or can obtain the denomination information by recognizing the denomination of the stored banknote image by the denomination recognition unit 2.

The character string extraction device 10 sends the extracted image of the serial number or of each character in the serial number to the character recognition unit 5. The character recognition unit 5 performs the character recognition process on the received image by using the technology such as OCR, and obtains text data from the received image. The text data of the serial number extracted from the banknote image is used, for example, for management of information regarding the banknotes processed in the banknote handling apparatus.

The scanner 1 for obtaining the banknote image, the denomination recognition unit 2, and the character recognition unit 5 can be integrated in the character string extraction device 10, or these components (1, 2, and 5) and the character string extraction device 10 can be integrated as structural components in the banknote handling apparatus or the like.

The structure of the character string extraction device 10 is explained next. The character string extraction device 10 includes a control unit 3 and a memory 4.

The control unit 3 includes a skew correction unit 3A that corrects skew of the banknote image, a partial region extraction unit 3B that extracts a partial region including the serial number from the corrected banknote image, a character string frame evaluation value calculation unit 3C that sets a character frame for identifying the position of the serial number in the extracted partial region and evaluates the character frame, and a character position determining unit 3D that determines the position of each character in the serial number based on an evaluation value obtained by evaluating the character frame.

Character frame information 4A that includes information such as the height and width of the character frame and character string information 4B that includes the height and width of the serial number are stored in the memory 4. In the memory 4, background frame information 4C regarding a margin frame and/or a background frame that are set near the region in which the serial number is printed or set in the background of the serial number can be included. Details of these information will be given later.

Figure 2A:
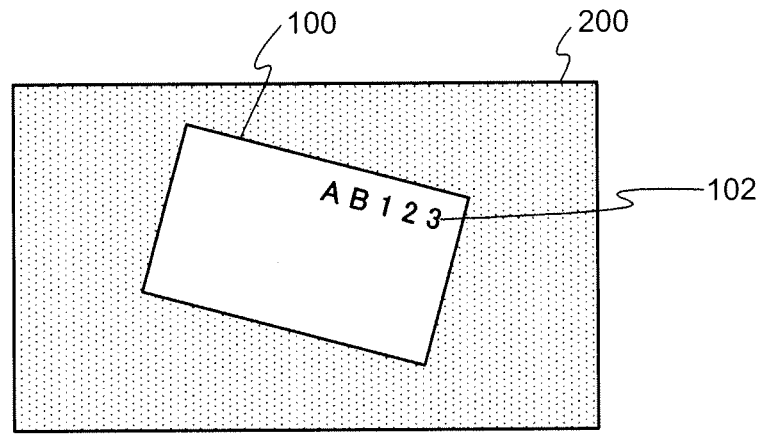
FIG. 2 is a diagram explaining a skew correction made to a paper sheet image by the character string extraction device.
Figure 2B:
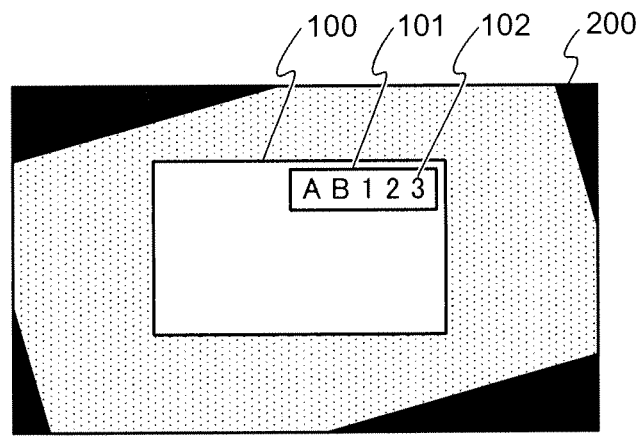

The structural components of the character string extraction device 10 are now explained. The skew correction unit 3A corrects skew of the banknote image received from the scanner 1. As for a method for generating the banknote image, the banknote can be scanned by the scanner 1 that is provided separately and has a feeder. Alternatively, the banknote that is being transported on a transport path in the banknote handling apparatus can be scanned by the scanner 1 that is integrated in the banknote handling apparatus. In the structure in which the banknote being transported is scanned by the scanner 1, a banknote image 100 can be skewed with respect to a rectangular image 200, as shown in FIG. 2A. This is caused by oblique movement of the banknote with respect to the scanner 1. When the banknote image 100 is skewed in the image 200 inputted by the scanner 1 as shown in FIG. 2A, the skew correction unit 3A rotates the image 200 to such an extent that four sides of the banknote image 100 run parallel to corresponding four sides of the image 200 as shown in FIG. 2B. That is, the skewed image is corrected so that the skewed serial number 102 as shown in FIG. 2A is corrected to the serial number 102 positioned parallel to the base of the image 200 as shown in FIG. 2B.

Figure 2C:
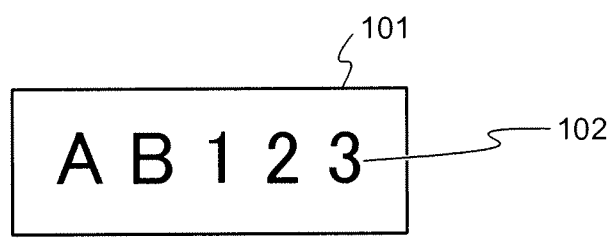

The partial region extraction unit 3B extracts a partial region 101 including the serial number 102 from the skew-corrected banknote image 200. The position of the serial number 102 printed on the banknote and also the height and width of the character string in the serial number 102 are predefined in accordance with the denomination of the banknote. Accordingly, the control unit 3 receives the denomination information of the banknote image 100 from the denomination recognition unit 2. The partial region extraction unit 3B extracts the partial region 101 from the banknote image 100 based on this denomination information. The extracted partial region 101 is, as shown in FIG. 2C, a rectangular image including the serial number 102. Information regarding the position, the width, the height, and the like of the partial region 101 to be extracted from the banknote image 100 is stored as the character string information 4B in the memory 4. The character string information 4B is stored in association with the denomination information, and therefore the character string information 4B can be read out based on the denomination information received from the denomination recognition unit 2.

In the above example, the partial region 101 including the serial number 102 is extracted after the skew correction unit 3A corrects the skew of the banknote image 100. The present invention, however, is not limited thereto. As long as the partial region 101 including the serial number 102 as shown in FIG. 2C can be obtained, the skew of the image of the partial region 101 can be corrected, for example, after the partial region 101 including the serial number 102 is extracted from the skewed banknote image 100.

The character string frame evaluation value calculation unit 3C sets the character string frame in the partial region 101 extracted from the banknote image 100 by the partial region extraction unit 3B. Furthermore, while moving the character string frame on the image of the partial region 101, the character string frame evaluation value calculation unit 3C calculates the evaluation value for evaluating the character string frame. The character position determining unit 3D identifies the base point of the character string frame based on the evaluation value calculated by the character string frame evaluation value calculation unit 3C, and determines the position of each character forming the serial number 102.

Processes performed by the character string frame evaluation value calculation unit 3C and the character position determining unit 3D will be discussed later in detail. A character frame 20 is explained now with reference FIGS. 3 to 6.

Figure 3:
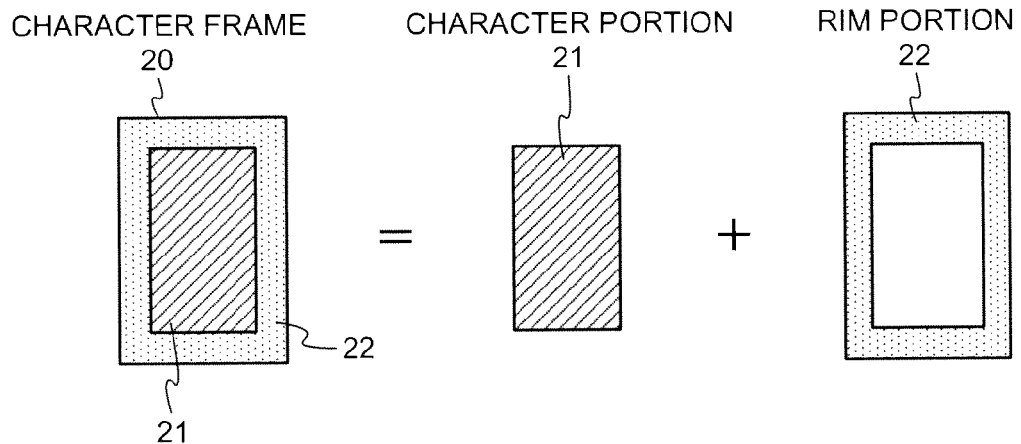
FIG. 3 is a diagram explaining a character frame that is used for identification of the position of a character string.

As shown in FIG. 3, the character frame 20 includes a character portion 21 and a rectangular rim portion 22 that surrounds the character portion 21. The size of the character portion 21 is determined in accordance with the character having the largest size among the characters that can be printed at a position of each digit in the serial number 102. More specifically, for example, if characters "1" and "8" have different widths and the size of "8" is larger than that of "1", the size of the character portion 21 is determined corresponding to the size of "8". That is, the character portion 21 is determined so that the largest character among the characters that can be printed at the digit position can fit inside.

Figure 4A:
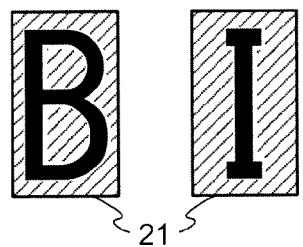
FIG. 4 is a diagram explaining how character portions are set.
Figure 4B:
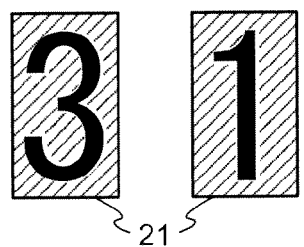

More specifically, as shown in FIG. 4A, for example, when a character "B" is the largest among possible characters at character positions where alphabets are used, the character portion 21 is set in accordance with the size of this character. The size of the character portion 21 is thus fixed at each character position, and the character portion 21 having this fixed size is used even for, for example, a narrower character such as "I". Similarly, as shown in FIG. 4B, when "3" is the largest at a character position where numbers are used, the character portion 21 is set corresponding to the size of this number. Even for a narrower number such as "1", the character frame 20 of thus fixed size is used.

Once the size of the character portion 21 is fixed, the rim portion 22 of a predetermined width that surrounds the character portion 21 is set, as shown in FIG. 3. The rim portion 22 is determined to have a width of several pixels, which is the surrounding area of the character in the serial number 102, so that the background of the character is included in the rim portion 22.

The shape of the character portion 21 is not limited to a rectangle. For example, the character portion 21 can be circular or oval as long as the character portion 21 at the character position includes the character but not any adjacent characters in the region. Similarly, the rim portion 22 does not have to be a complete rim but can be a belt-like incomplete rim region as long as it is in contact with the character portion 21 and does not include any adjacent other characters.

FIG. 5 shows examples of character frames 20 set based on the method explained with reference to FIGS. 3 and 4. As shown in FIG. 5A, a character frame 20 is formed at the position of each character in the serial number 102 to include a character portion 21 in which any character possible to be used can fit and a rim portion 22 that surrounds the character portion 21. The width of the rim portion 22 is not limited as long as the rim portion 22 surrounding the character portion 21 does not have an overlapping portion with the character portions 21 of any adjacent characters. It is preferable, however, that the width of the rim portion 22 be set to the width of several pixels, as described above. A spacing region 23 that is not included in the character frame 20 can be formed between two adjacent rim portions 22, as shown in FIG. 5A. A character string frame 24 is set outside the rim portion 22 so that all the character frames 20 are included inside. If there is any spacing region 23, both the spacing regions 23 and the character frames 20 should be included inside.

Figure 5A:
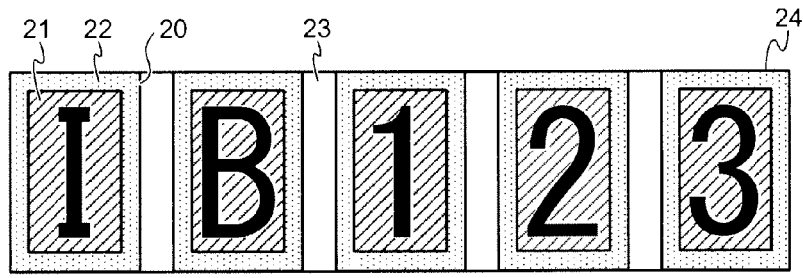
FIG. 5 is a diagram explaining character string frames each including character frames.
Figure 5B:
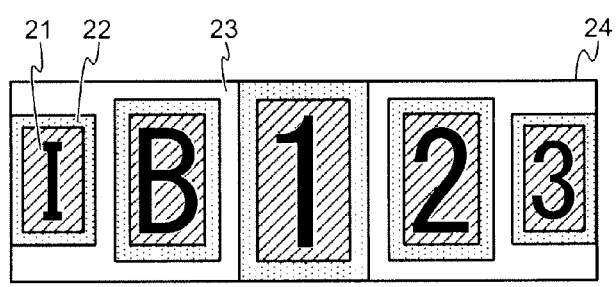
Figure 5C:
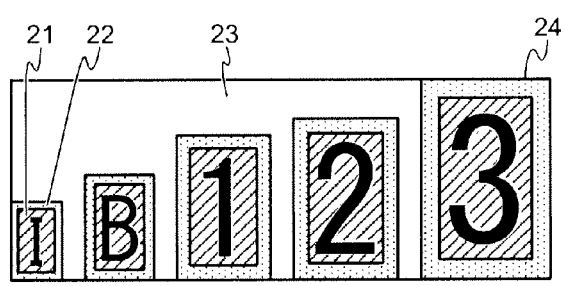
Figure 5D:
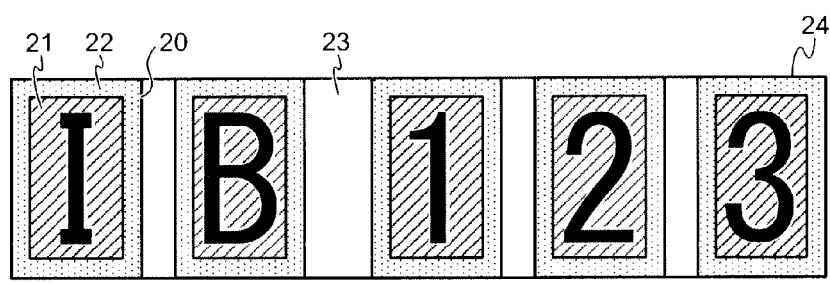
Figure 5E:
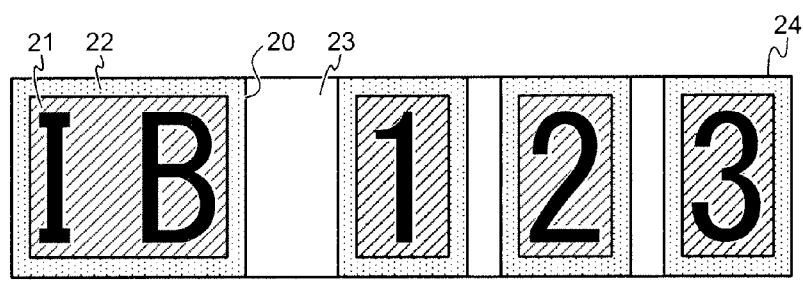

For the serial number 102 that includes characters of different sizes at different character positions, the character frames 20 of different sizes can be set within the character string frame 24, as shown in FIGS. 5B and 5C. The character string frame 24 is set as a rectangular region that includes all of the left-most character frame 20, the right-most character frame 20, and the largest character frame 20 in the character string of the serial number 102. When spacing between the characters is inconsistent, part of the spacing region 23 can be larger than the rest of the spacing region 23, as shown in FIG. 5D. In a serial number in which the positions of the characters and the spacing between the characters vary depending on the type of character, a single character frame can be set for multiple character positions as shown in FIG. 5E. As described above, the positions and sizes of the character frame 20 and the character string frame 24 are not particularly limited, and can be suitably set in accordance with the structure of the serial number 102.

Figure 6:
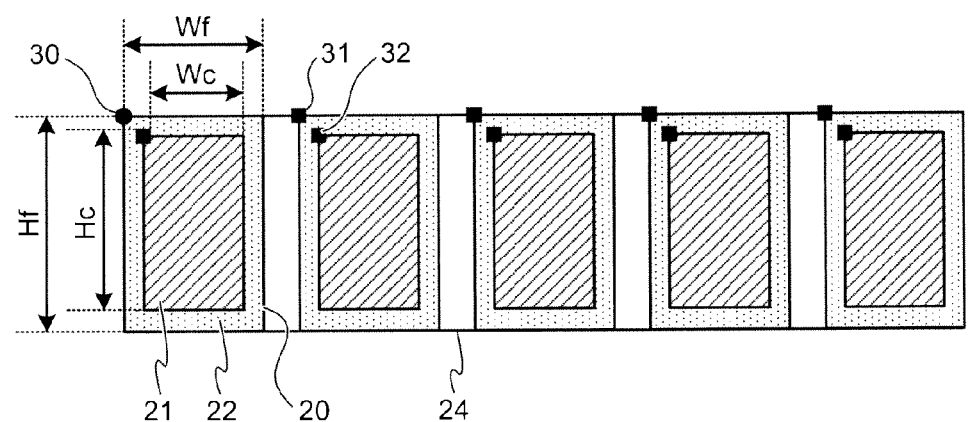
FIG. 6 is a diagram explaining contents of character frame information stored in a memory.

The information for setting the character portions 21, the rim portions 22, the character frames 20, and the character string frames 24 is previously stored in the memory 4 as the character frame information 4A. More specifically, as shown in FIG. 6, for example, the character frame information 4A includes, for each character of the serial number 102, relative coordinates of an upper left corner 31 of each character frame 20 and an upper left corner 32 of each character portion 21 with respect to a base point 30, which is an upper left corner of the character string frame 24, and also a width Wf and a height Hf of each character frame 20 and a width Wc and a height Hc of each character portion 21. That is, the memory 4 stores therein the character frame information 4A, which is necessary for setting, once the base point 30 is set, the character frame 20 that includes the character portion 21 and the rim portion 22 for each character position and the character string frame 24 that includes all the character frames 20, as shown in FIG. 6. The character frame 20 and the character string frame 24 are set such that, when the base point 30 is set at a suitable position on the banknote image, the characters in the serial number 102 can fit inside the regions of the corresponding character portions 21.

The overall process performed by the character string frame evaluation value calculation unit 3C is explained now with reference to FIG. 7. When the image of the partial region 101 containing the serial number 102 is extracted through the processes performed by the skew correction unit 3A and the partial region extraction unit 3B as shown in FIG. 7A, the character string frame evaluation value calculation unit 3C first sets the character string frame 24 that includes character frames 20(m), which include character portions 21(m) and rim portions 22(m), and the spacing regions 23 as shown in FIG. 7B. Here, "m" indicates the number of characters included in the character string frame 24, where the left-most character frame is denoted as 20(1), and the character portion and the rim portion of the character frame 20(1) are denoted as 21(1) and 22(1), respectively.

Figure 7A:
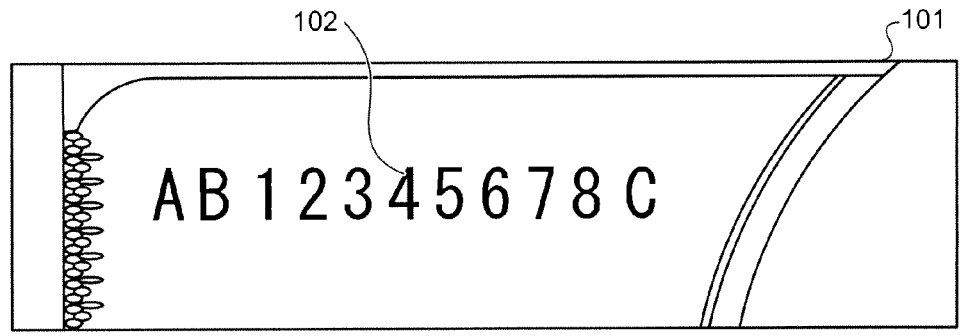
FIG. 7 is a diagram explaining how the position of a character string is identified by using the character string frame.
Figure 7B:
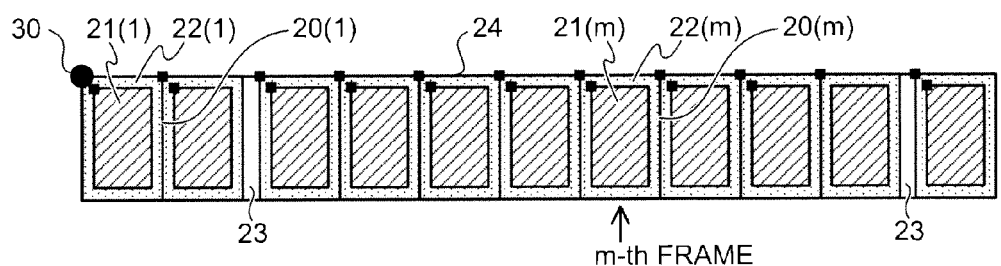
Figure 7C:
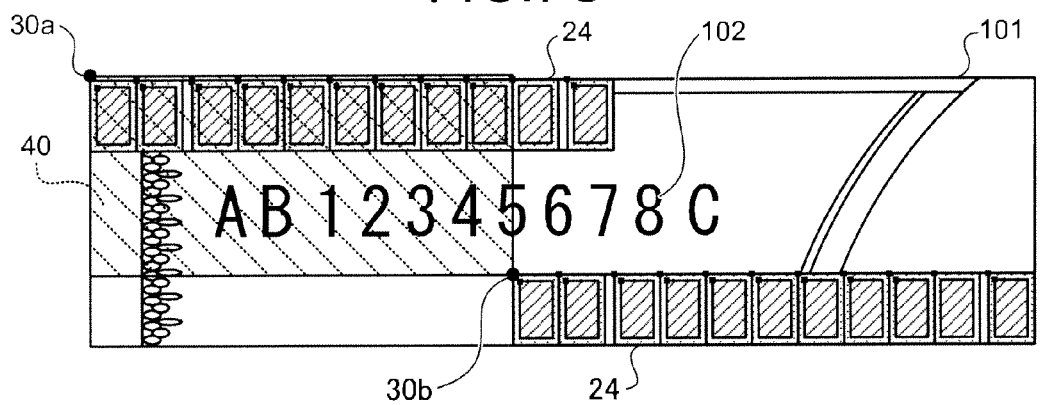
Figure 7D:
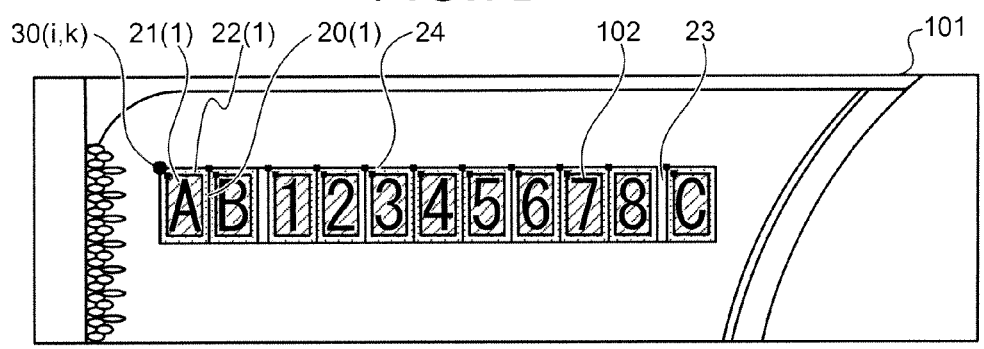

After the character string frame 24 is set, as shown in FIG. 7C, a base point scanning region 40 having a start point 30a and an end point 30b as its vertices is set. An upper left corner 30a of the partial region 101 is set as the start point of the base point scanning region 40, and a position of the base point 30 of the character string frame 24, when bringing a lower right corner of the character string frame 24 to coincide with a lower right corner of the partial region 101, is set as the end point 30b. The position of any pixel included in the base point scanning region 40 can be the coordinate of the base point 30. The character string frame evaluation value calculation unit 3C calculates, at each of the coordinates, the evaluation value for evaluating the position of the character string frame 24. This evaluation value is set such that its maximum value appears when, as shown in FIG. 7D, each character in the serial number 102 comes into the position of the corresponding character portion 21(m).

That is, the character string frame evaluation value calculation unit 3C sets a possible area of the character string frame 24 inside the image of the partial region 101, and calculates the evaluation values at different positions while moving the character string frame 24 within this possible area. For the calculation of the evaluation values, the calculation method is established such that the evaluation value reaches its maximum when the set character string frame 24 is at an optimal position for extracting each character in the serial number 102, as shown in FIG. 7D. By comparing the evaluation values calculated at the different positions and finding the position of the base point 30 at which the evaluation value indicates the maximum, the position of the character string frame 24 where each character of the serial number 102 is included in the corresponding character portion 21(m) can be determined.

The process performed by the character string frame evaluation value calculation unit 3C is explained in detail below with reference to the flowchart shown in FIG. 8.

First, the character frame information 4A is read from the memory 4 to set the character string frame 24 that includes the character frames 20(m) on the partial region 101 containing the serial number 102 (Step S1 in FIG. 8). The character frame information 4A, which has been stored in association with the denomination information, is read out based on the denomination information received from the denomination recognition unit 2. The character frame 20 and the character string frame 24 are set by the method explained with reference to FIGS. 3 to 7.

Before starting the calculation of the evaluation values for the character frame 20(m) and the character string frame 24, a maximum of a total evaluation value (character string frame evaluation value) is initialized to 0 (zero) (Step S2). Thereafter, a total evaluation value Sc(i, k) when the position of the base point 30 is at the coordinate (i, k) inside the base point scanning region 40 is calculated (hereinafter, the coordinate (i, k) is referred to as "base point evaluation coordinate"). This total evaluation value Sc(i, k) is set such that it reaches a maximum when the set character string frame 24 is at an optimal position for extracting each character in the serial number 102 as shown in FIG. 7D, for example. The method for calculating this total evaluation value Sc(i, k) will be discussed later.

After calculation of the total evaluation value Sc(i, k) at the base point evaluation coordinate (i, k), the calculated total evaluation value is compared with a maximum evaluation value that is stored as the maximum of the total evaluation value (Step S4 in FIG. 8).

If the calculated total evaluation value Sc(i, k) is greater than the maximum of the previously calculated total evaluation value (Yes at Step S4), this current calculated total value Sc(i, k) is stored as the maximum evaluation value in the memory 4. Furthermore, the base point evaluation coordinate (i, k), at which the current value is calculated, is also stored in the memory 4 as a position of the base point 30 of the character string frame 24 for identifying the position of the serial number 102 (Step S5).

Thereafter, if there is any set of base point evaluation coordinate (i, k) that is to be evaluated in the base point scanning region 40 shown in FIG. 7C (No at Step S6 in FIG. 8), the above process (Steps S3 to S5) is repeated. If the evaluation is completed for all the sets of evaluation coordinate (Yes at Step S6), the process performed by the character string frame evaluation value calculation unit 3C is terminated. In the example shown in FIG. 7, the total evaluation value Sc(i, k) reaches the maximum when the position of the base point 30 shown in FIG. 7D is determined as the base point evaluation coordinate (i, k) through this process, and therefore these base point evaluation coordinates (i, k) are stored in the memory 4.

Based on the evaluation result obtained by the character string frame evaluation value calculation unit 3C, the character position determining unit 3D sets a position of the base point 30 of the character string frame 24 at the base point evaluation coordinate (i, k) having the maximum total evaluation value Sc(i, k) as shown in FIG. 7D. Then, the regions set as the character portions 21(m) are determined as the regions that include the characters of the serial number 102 (Step S7 in FIG. 8). The character position determining unit 3D extracts, from the image of the partial region 101, the image of each region set as the character portion 21(m) and sends it to the character recognition unit 5. The character recognition unit 5 performs character recognition on the image received from the character position determining unit 3D by using the technology such as OCR, and thereby converts the character contained in the images to text data. The character recognition unit 5 receives, as shown in FIG. 10B, the image in which unnecessary regions such as the margins and the background are cut off and a single character of the serial number 102 is fully and largely presented, and therefore the character recognition can be accurately performed. The character position determining unit 3D extracts the image based on the character portion 21(m). Alternatively, an image of the region including the rim portion 22(m) can be extracted based on the character frame 20(m), or an image containing the entire serial number 102 can be extracted based on the character string frame 24. Here, m indicates the m-th character frame.

Next, the process of calculating the total evaluation value Sc(i, k) is explained in detail with reference to the flowchart shown in FIG. 9. The total evaluation value Sc(i, k) indicates the sum of the evaluation values for all the character frames 20(m) that are included in the character string frame 24 of which the base point 30 is being set at the base point evaluation coordinate (i, k). First, initialization is performed so that the total evaluation value is brought to 0 (zero) (Step S11 in FIG. 9). Thereafter, the calculation of the evaluation value for each character frame 20(m) is initiated.

As a feature value of each character portion 21(m), an average density, average brightness of pixels, C(m) is calculated (Step S12). For example, when eleven character frames, 20(1) to 20(11), are included in the character string frame 24, or in other words when the serial number 102 has eleven characters, average densities C(1) to C(11) are calculated.

The average density indicates an average of pixel values in a region. For example, when a gray-scale image is rendered in 256 shades with black being 0 (zero) and white being 255, each pixel of this image has one of pixel values from 0 to 255 in accordance with the shade of the image. The average of the pixel values included in each character portion 21(m) is the average density C(m) for one character of the character portion 21(m).

Figure 10A:
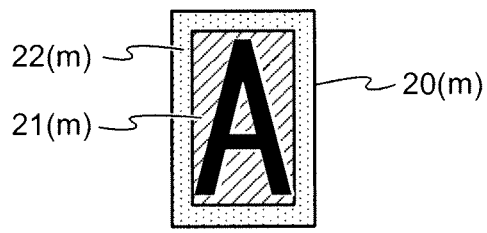
FIG. 10 is a diagram explaining character frame evaluation values.
Figure 10B:
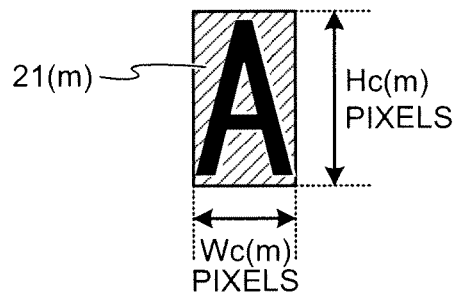

The method for calculating the average density C(m) is explained now in detail by using an example of the character frame 20(m) set as shown in FIG. 10A. When the number of pixels in the width direction of the character portion 21(m) is Wc(m) and the number of pixels in the height direction is Hc(m) as shown in FIG. 10B, the pixel values of all the pixels in the character portion 21(m), which are density values, are added up to obtain a density total value Vc(m). This density total value Vc(m) is divided by the number of pixels in the character portion 21(m) (Wc(m)×Hc(m)) to obtain the average density C(m) of the character portion 21(m). That is, the average density C(m) can be expressed by C(m)=Vc(m)/(Wc(m)×Hc(m)).

Figure 10C:
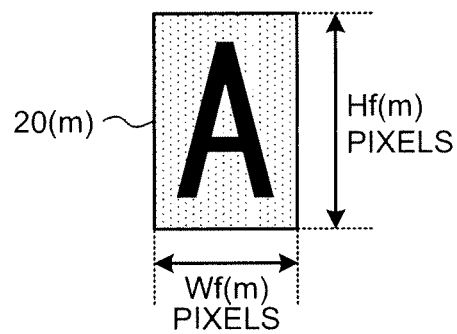

Next, the average density F(m) is calculated as the feature value of the rim portion 22(m) (Step S13 in FIG. 9). The average density F(m) of the rim portion 22(m) is the average of pixel values in the surrounding rim portion 22(m) on the partial region 101. The method for calculating the average density F(m) is explained in detail with reference to FIG. 10. The pixel values of all the pixels, which are density values, in the character frame 20(m) having the number Wf(m) of pixels in the width direction and the number Hf(m) of pixels in the height direction as shown in FIG. 10C are added up to obtain a density total value Va(m). The average density F(m) of the rim portion 22(m) is the average density of the pixels in the surrounding region. The average density F(m) is therefore calculated by using the density total value Va(m) of the entire character frame 20(m) and the density total value Vc(m) of the above character portion 21(m), and is expressed by F(m)=(Va(m)−Vc(m))/{(Wf(m)×Hf(m))−(Wc(m)×Hc(m))}.

An evaluation value Ec(m) of the character frame 20(m) is calculated next (Step S14 in FIG. 9). The character frame evaluation value Ec(m) is calculated by Ec(m)=F(m)−C(m). With this character frame evaluation value Ec(m), whether the character frame 20(m) is set at an appropriate position for the characters in the serial number 102, or in other words whether the character frame 20(m) is suitably positioned so that the character image can be extracted in accordance with the character portion 21(m), can be evaluated.

Figure 10D:
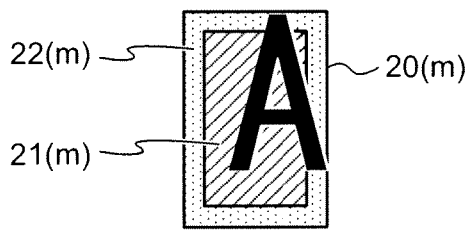

In the image of the partial region 101, the characters of the serial number 102 are generally formed of deeper (darker) pixels than pixels of the background. The average density C(m) of the character portion 21(m) and the average density F(m) of the rim portion 22(m) tends to decrease as the number of pixels of the characters in the region increases. For example, if a character is only partially included in the character portion 21(m) as shown in FIG. 10D, the average density C(m) increases as the character "A" is shifted away from the character portion 21(m). In contrast, when the entire character is included in the character portion 21(m) as shown in FIG. 10A, the average density C(m) is decreased to a minimum. In contrast, when the character is shifted away from the character portion 21(m) and is partially included in the rim portion 22(m) as shown in FIG. 10D, the average density F(m) of the rim portion is decreased. When the character is entirely included in the character portion 21(m) as shown in FIG. 10A, the average density F(m) reaches the maximum.

The above evaluation formulae are set such that, when the character frame 20 is set at an appropriate position to contain the characters of the serial number 102, the average density C(m) of the character portion 21(m) reaches the minimum, and the average density F(m) of the rim portion 22(m) reaches the maximum.

In the above example, the characters are formed of pixels that are in deeper (darker) color than the background. The present invention, however, is not limited thereto. For example, in contrast to the above case, if the characters are formed of paler (brighter) pixels than pixels of the background, the average density C(m) reaches the maximum, while the average density F(m) reaches the minimum when the character is entirely included in the character portion 21(m). In such a case, the character frame evaluation value Ec(m) can be expressed by Ec(m)=C(m)−F(m). Also, when the image explained in FIGS. 9 and 10 is to be processed by using a negative image obtained by reversing its gradation, the character frame evaluation value Ec(m) can be calculated by Ec(m)=C(m)−F(m). That is, the evaluation formula for the character frame evaluation value Ec(m) is not particularly limited as long as the character frame evaluation value Ec(m) reaches the maximum in accordance with the image features of the printed characters when the character is suitably included in the character portion 21(m).

The character frame evaluation value Ec(m) is calculated for all of the character frames 20(m) included in the character string frame 24 (No at Step S15 in FIG. 9). When the character frame evaluation values Ec(m) are calculated for all the character frames 20(m) (Yes at Step S15), the character frame evaluation values Ec(m) are added up to obtain the total evaluation value Sc(i, k) (Step S16).

In the above example, the average densities are used as the feature values of the character portion 21(m) and the rim portion 22(m); however, the feature values are not limited thereto. Any feature value can be used as long as pixels representing characters and pixels representing background other than the characters have different values, and also the values vary in accordance with the number of pixels that form the characters in the region. For example, the brightness of RGB colors or the like of a color banknote image can be used. Furthermore, the evaluation value is not limited to the average of the pixel values in the region. The evaluation value can be set such that the value varies in accordance with the number of pixels that form the characters in the character portion 21(m) and the evaluation value reaches the maximum when the entire character is included within the character portion 21(m). For example, the sum of the pixels or the like can be used.

According to the above method, the character frame evaluation value Ec(m) reaches the maximum when each character in the serial number 102 is entirely included in the character portion 21(m). Furthermore, the total evaluation value Sc(i, k) reaches the maximum when all the characters in the serial number 102 are entirely included within the character portions 21(m) of the character frames 20(m) in the character string frame 24. The total evaluation value Sc(i, k) is calculated while moving the base point 30 in the partial region 101, and the position of the base point 30 for the maximum total evaluation value Sc(i, k) can be detected. With this method, the position of the character string frame 24 can be identified as shown in FIG. 7D.

The character string frame 24 includes multiple character frames 20(m) and is set in accordance with the denomination. The position of the character string frame 24, at which the maximum evaluation value is obtained, is determined by moving and scanning the character string frame 24 inside the partial region 101, and comparing relatively the evaluation values at different positions. Accordingly, the positions of the characters can be accurately identified even if there is a design or a pattern in the background of the serial number 102.

In addition, evaluation is made at the position of each character by using the character frame 20(m) that is set to include the character portion 21(m) and the rim portion 22(m) in accordance with each character in the serial number 102. The evaluation is also made by using the character string frame 24 that is set to include multiple character frames 20(m). Even when a character that is not the serial number is present near some of the target characters or when there is a design or a pattern in the background of the target characters, the position of the serial number 102 can be accurately identified.

Second Embodiment

The method for extracting the image explained in the first embodiment is such that the character string frame 24 is moved on the image of the partial region 101 that contains the serial number 102, and that the position at which the maximum evaluation value is obtained is identified as the position for extracting the serial number 102. The evaluation value is calculated while the position of each character frame 20(m) in the character string frame 24 is fixed with respect to the character string frame 24. The present invention is not limited thereto. A method is explained in the second embodiment in which the evaluation coordinates are evaluated while individually moving each of the character frames 20(m) with respect to the character string frame 24.

In the second embodiment, the methods for setting the character frame 20(m) that includes the character portion 21(m) and the rim portion 22(m), setting the character string frame 24 that includes the multiple character frames 20(m), calculating the evaluation value by using the average density, and extracting an image by determining the evaluated position at which the evaluation value reaches the maximum as the position of the serial number 102 are the same as those of the first embodiment so that the explanation of these methods has been omitted.

The second embodiment is different from the first embodiment only in that the method for evaluating each character frame 20(m) in calculation of the total evaluation value Sc(i, k) of the character string frame 24 at the base point evaluation coordinates (i, k), which are the coordinates of the base point 30. This difference is explained in detail below.

The character string extraction device 10 extracts and uses the partial region 101 containing the serial number 102 from the banknote image 100. If the banknote is warped during scanning, or if sampling intervals vary due to unevenness in transport of the banknotes, the image of the serial number 102 on the banknote image 100 is likely to be warped. Due to such warping, the characters that are supposed to be evenly spaced and horizontally aligned can become unevenly spaced or tilted. In addition, the serial number 102 on the image can be tilted as the correction made by the skew correction unit 3A is not always perfect. Even if the banknote image 100 is normally scanned, the banknote itself, such as a shrunk banknote, may not be of good quality, and the serial number 102 printed on the banknote can be displaced or tilted.

In the second embodiment, the positions of the characters in the serial number 102 can be accurately identified even in such cases. This can be achieved by moving the position of the character frame 20 relative to the character string frame 24 and detecting the position at which the character frame evaluation value Ec(m) reaches the maximum in the process of calculating the character frame evaluation value Ec(m) that has been explained with reference to FIGS. 8 and 9.

Figure 11:
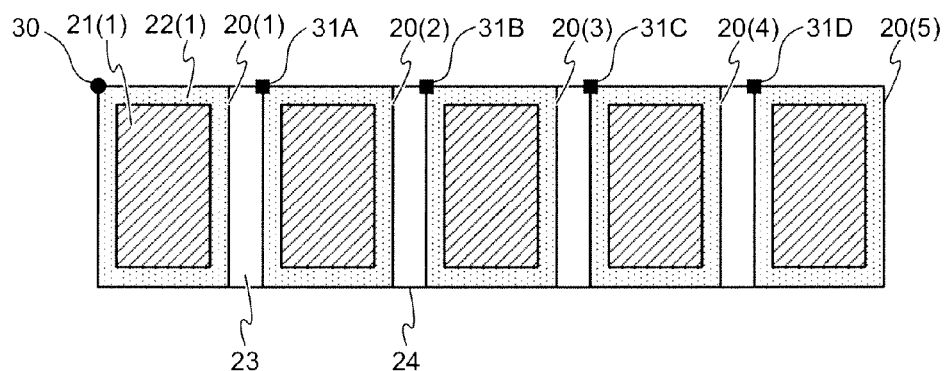
FIG. 11 is a diagram explaining a character string frame according to a second embodiment.

The method is explained in detail with reference to FIGS. 11 and 12. First, in the same manner as in the first embodiment, the character frame evaluation value Ec(m) of each character frame 20(m) is calculated by using the character string frame 24 set as shown in FIG. 11, including multiple character portions 21(m), multiple rim portions 22(m), and multiple spacing regions 23. In an example shown in this drawing, m can take any value from 1 to 5. Thereafter, with the character string frame 24 being fixed, or in other words with the base point 30 being fixed, four character frames 20(2) to 20(5), except for character frame 20(1), are shifted vertically and horizontally for a predetermined number of pixels, to re-calculate character frame evaluation values Ec(2) to Ec(5). For example, each of the character frames 20(2) to 20(5) is shifted, by one pixel to each direction, left, right, up and down, with respect to the coordinates 31A to 31D of the upper left corner of the character frames, and the evaluation is made at each position. Alternatively, a rectangular region having several pixels on a side can be set around the coordinates 31A to 31D so that points of the character frames 20(2) to 20(5) corresponding to the coordinates 31A to 31D move within this rectangular region, and the character frame evaluation value Ec(m) can be obtained at each position. In addition to the above, the character frame 20(1) can also be moved.

Figure 12A:
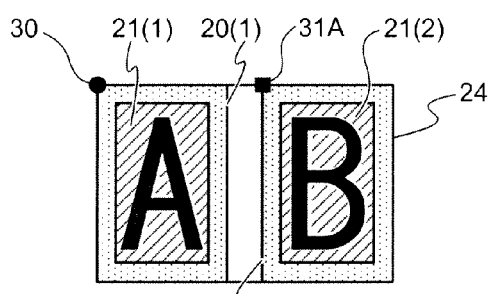
FIG. 12 is a diagram explaining how a character frame is moved in the character string frame.
Figure 12B:
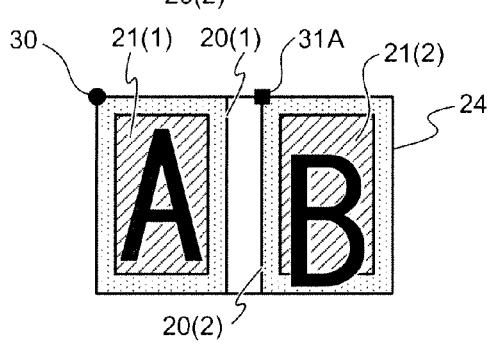
Figure 12C:
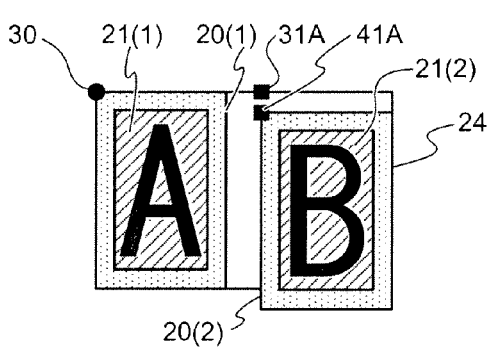

For example, when the character string frame 24 is set, the characters should fit into the character portions 21(1) and 21(2), as shown in FIG. 12A. In a case as shown in FIG. 12B, however, the second character "B" is displaced on the image due to warping of the image as described above. In the second embodiment, as shown in FIG. 12C, the position of the character frame 20(1) for the first character "A", of which the base point 30 coincides with the upper left corner, is fixed, and the evaluation on the other character frame 20(2) is made at positions shifted for a predetermined number of pixels in predetermined horizontal and vertical directions. The character frame evaluation value Ec(2) reaches the maximum when the character entirely fits in the character portion 21(m), and therefore the evaluation value is greater in FIG. 12C than that in FIG. 12B. Accordingly, information regarding coordinate 41A in the state of FIG. 12C is stored in the memory 4 in association with the base point 30, and the process is continued, with the total evaluation value Sc(i, k) that is calculated at the base point evaluation coordinate (i, k) not in the state of FIG. 12B but in the state of FIG. 12C. Consequently, if the total evaluation value Sc(i, k) reaches the maximum in the state of FIG. 12C, the character position determining unit 3D determines the position of the character portion 21(2) corresponding to the second character "B", not as the character portion 21(2) in FIG. 12B but as the character portion 21(2) in FIG. 12C, based on the coordinate 41A stored in the memory 4. In the above explanation, the second character is used as the example, however, this process can be performed on each character in the character string frame 24.

As described above, as the evaluations are made by shifting the character frame 20(m) included in the character string frame 24 within the predetermined region so that, even if the serial number 102 printed on the banknote is displaced or if the serial number 102 is displaced on the banknote image, the position of each character can be accurately identified to extract the region that contains the character.

The direction and amount of movement of the character frame 20(m) can be initially set such that, for example, the character frame 20(m) can be moved in vertical and horizontal directions with a pitch of 1 pixel and up to 5 pixels. The process can be performed based on this initial setting.

The present invention is not limited thereto. For example, if the character frame evaluation value Ec(m) increases when the character frame 20 at the position of the m-th character is shifted, the process can be performed by dynamically changing the setting of the amount and direction of movement for its subsequent character positions.

More specifically, for example, even if the evaluation is made again after moving the character frame 20(2) for the second character in FIG. 11 for 5 pixels with a pitch of 1 pixel in vertical and horizontal directions, the character frame evaluation value Ec(2) does not change. In contrast, in the character frame 20(3) for the third character, the character frame evaluation value Ec(3) increases when the character frame 20(3) is moved to the right for 3 pixels. In this case, the operation of moving to the left is not performed on the character frame 20(4) for the fourth character. Also, the setting for the direction and amount of moving the character frame 20(4) is changed so that only the operations of moving for 5 pixels with a pitch of 1 pixel in the vertical direction and of moving to the right are performed. The amount of movement to the right need not be 1 to 5 pixels, i.e., need not follow the initially setting, but can be dynamically changed such as 3 to 5 pixels or 5 pixels from 3 pixels.

When displacement of the characters in the serial number 102 begins from a position of one of the characters in the middle due to the displacement in printing or warping of the image, it is unlikely that the positions of the subsequent characters come back to the non-displaced normal positions. In most cases, the displacement continues, or the amount of displacement enhances. By dynamically changing the setting, the amount of entire processing can be reduced, and the effects of the processing similar to the processing performed without changing the initial setting can be achieved.

Figure 13A:
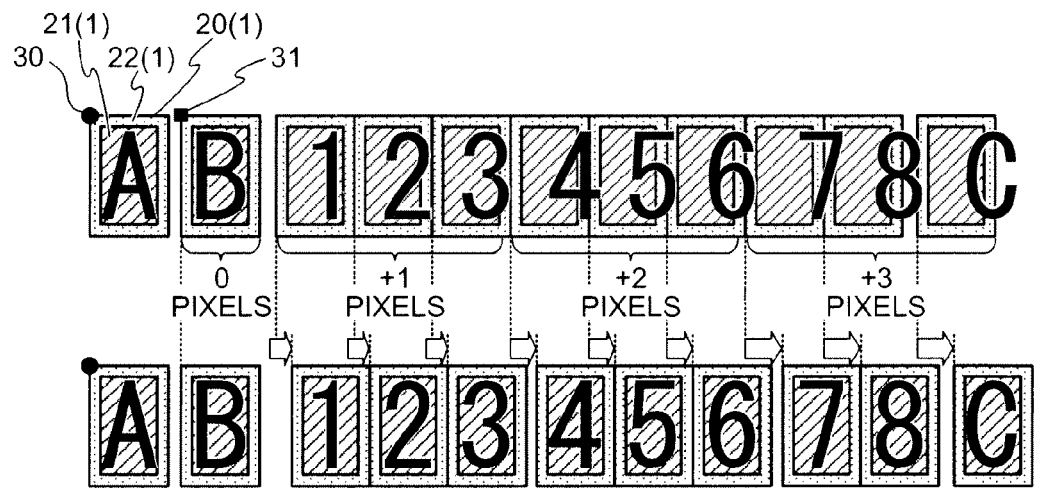
FIG. 13 is a diagram explaining how each character frame is moved in the character string frame.
Figure 13B:
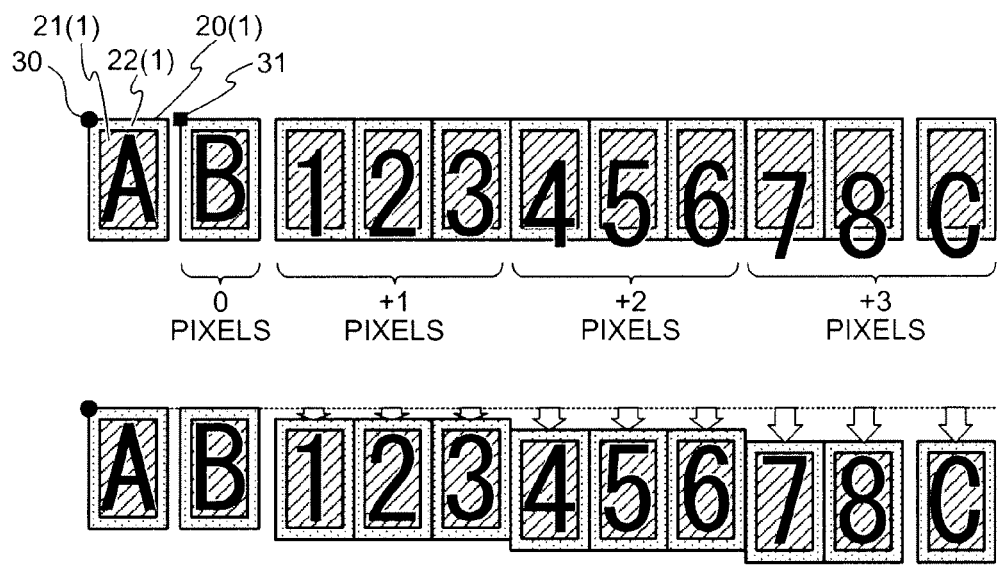

FIG. 13 shows an example in which the displacement of the character positions increases in one direction. In the upper row of FIG. 13A, the displacement to the right begins from the third character from the left. If the character frame 20 is fixed as in the first embodiment, the displacement of the characters from the character frames 20(m) increases as one goes toward the right. In such a case, the character frame evaluation value Ec(m) cannot be accurately calculated, and consequently, the positions of the characters cannot be accurately identified. In contrast, in the method according to the second embodiment, as the process is performed on each character frame 20(m) such that, as shown in the lower row of FIG. 13A, by moving the character frame 20(m) for the third to fifth characters for 1 pixel, the sixth to eighth characters for 2 pixels, and the ninth to eleventh characters for 3 pixels, the character frame evaluation value Ec(m) is calculated, the positions of the characters can be accurately identified. Similarly, FIG. 13B shows an example where the displacement of the character positions increases as one goes downward.

The above process of evaluating the positions of the character frames 20(m) by moving them with respect to the character string frame 24 can be performed in all cases, or can be performed as reevaluation only when the maximum evaluation value obtained in the method according to the first embodiment is smaller than a predetermined value. The total evaluation value Sc(i, k) obtained when the position of the serial number 102 is identified can vary in accordance with the type of the character in the serial number 102 or the like. As shown in FIGS. 12 and 13, however, the total evaluation value Sc(i, k) significantly degrades when the displacement of the characters occurs, in comparison with a decrease caused due to a change in the types of the characters. Based on this fact, a threshold value can be set, and only when the maximum total evaluation value Sc(i, k) is smaller than the threshold value, it can be judged that the value is small because of the displaced characters, and only in that case the above process can be performed to move the character frames $20(m)$.

As explained above, the evaluation is performed by moving the positions of the character frames $20(m)$ with respect to the base point 30 without fixing the positions of the character frames $20(m)$ with respect to the character string frame 24. Hence, even when the positions of the characters in the serial number 102 are displaced on an actual banknote or displaced due to the warping of the image, the positions of the characters can still be accurately identified.

Furthermore, how the displacement of the position of the character in the serial number 102 has been caused is considered, and when displacement is detected at a certain character position, the character frames $20(m)$ at the subsequent character positions are not moved in a direction opposite to the direction in which the displacement is detected. The setting of the direction and amount of moving the character frames 20 can be dynamically changed so that the process can be performed by using the detected amount of displacement as the initial value of the subsequent characters. The entire processing amount thereby can be reduced, and the processing speed can be increased.

In addition, the process of moving the positions of the character frames $20(m)$ can be performed only when the maximum total evaluation value Sc(i, k) obtained with the character frames $20(m)$ being fixed is smaller than the predetermined value. Consequently, the processing speed can be increased, and the entire processing amount can be reduced, while the similar effects can be achieved.

Third Embodiment

In the method according to the first and second embodiments, the character frame 20 is set for each character in the serial number 102; however, the present invention is not limited thereto. In the third embodiment, an evaluation method is explained in which, in addition to the character frame 20 for each character in the serial number 102, a background frame for a margin, a character string, a pattern, and the like in the background of the serial number 102 is used.

According to the third embodiment, the methods for setting the character frame $20(m)$ that includes the character portion $21(m)$ and the rim portion $22(m)$, setting the character string frame 24 that includes the multiple character frames $20(m)$, calculating the evaluation value by using the average density, extracting an image by determining the evaluation position at which the evaluation value reaches the maximum as the position of the serial number 102, and dealing with displacement in printing and warping of the image by moving the character frames $20(m)$ are the same as those of the first and second embodiments. Therefore, the explanation of these methods has been omitted.

The third embodiment differs from the first and second embodiments only in that the character string frame 24 that is used in calculation of the evaluation value includes not only the character frames $20(m)$ each for a character in the serial number 102, but also the background frame for evaluating the background of the serial number 102. This difference is explained in detail below.

Figure 14A:
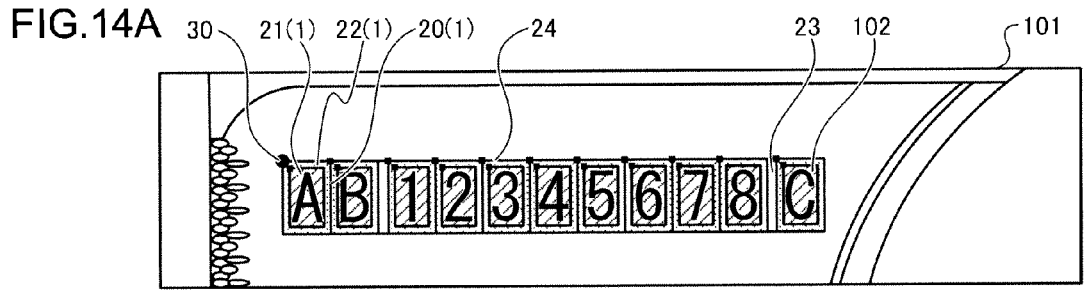
FIG. 14 is a diagram explaining a margin frame, which is one type of background frame, according to a third embodiment.
Figure 14B:
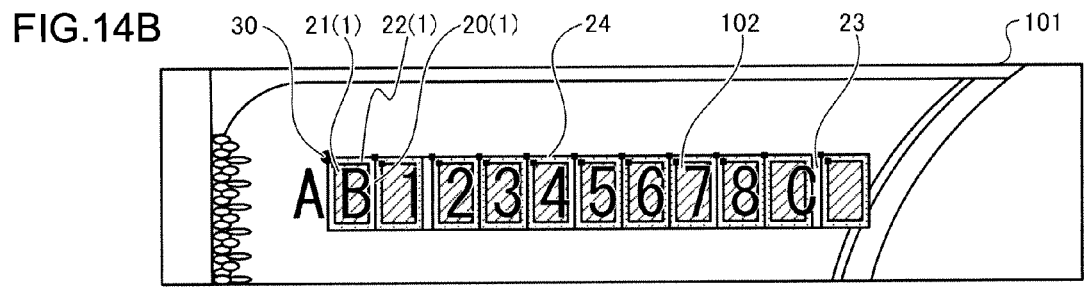

As shown in FIG. 14A, the position of the serial number 102 can be identified with the methods explained in the first and second embodiments. If, however, there is a stain or the like on the right side of the right-most character in the serial number 102, the identified position of the serial number 102 may undesirably shift as shown in FIG. 14B. Recognition of a character of which position is shifted in units of characters is called "digit shift". The digit shift tends to occur in a similar manner when there is some pattern near the serial number 102.

Figure 14C:
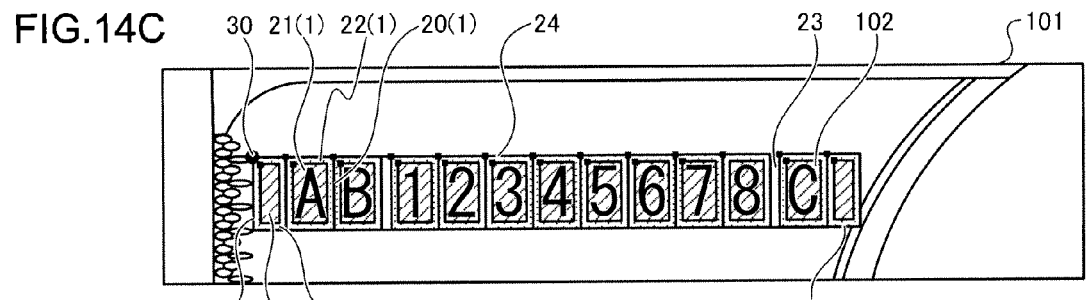

In the third embodiment, as shown in FIG. 14C, in addition to the character frames $20(m)$ set in alignment with the position of the serial number 102, margin frames $50(n)$ are set in margins on the left and right of the serial number 102, to evaluate the margins. Similarly to the character frame $20(m)$, a margin frame $50(n)$ includes a character portion $51(n)$ and a rim portion $52(n)$. Here, "n" corresponds to the number of margin frames included in the character string frame 24. In the example on the drawing, the left margin frame and the right margin frame are denoted as $50(1)$ and $50(2)$, respectively. The character portion and the rim portion of the left background frame $50(1)$ are denoted as $51(1)$ and $52(1)$, respectively, and the character portion and the rim portion of the right background frame $50(2)$ are denoted as $51(2)$ and $52(2)$.

The difference between the character frame $20(m)$ and the margin frame $50(n)$ resides in that the character portion $21(m)$ of the character frame $20(m)$ is set to include a character in the serial number 102, while the character portion $51(n)$ of the margin frame $50(n)$ is set not to include any character or any pattern and the like.

The evaluation value Ec(m) of the character frame $20(m)$ is calculated by subtracting the average density C(m) of the character portion $21(m)$ from the average density F(m) of the rim portion $22(m)$ (Ec(m)=F(m)−C(m)). In contrast, an evaluation value Eb(n) of the margin frame $50(n)$ is a negative value obtained by multiplying the absolute value of the difference (F(n)−C(n)) between the average density C(n) of the character portion $51(n)$ and the average density F(n) of the rim portion $52(n)$ by −1. Thereafter, the total evaluation value Sc(i, k) is calculated as the total of all the character frame evaluation values Ec(m) and the margin frame evaluation values Eb(n). That is, an average density difference between the character portion and the rim portion ($21(m)$ and $22(m)$, and $51(n)$ and $52(n)$) is calculated for each of the character frames $20(m)$ and the margin frames $50(n)$, and then the total of the absolute values of the differences for all the margin frames $50(n)$ multiplied by −1 is added to the total of the differences for all the character frames $20(m)$, thereby the total evaluation value Sc(i, k) is obtained.

In the margin frame $50(n)$, which is set in a margin portion having no character or pattern, there should not be any difference between the average densities of the character portion $51(n)$ and the rim portion $52(n)$, and the evaluation value Eb(n) that is the difference of the average densities should therefore be 0 (zero). If the digit shift occurs and the margin frame $50(n)$ now includes a character or a background pattern, a difference is created between the average densities of the character portion $51(n)$ and the rim portion $52(n)$ and is no longer 0 (zero). Therefore, the negative value obtained by multiplying the absolute value of the difference by −1 is set as the evaluation value Eb(n) of the margin frame $50(n)$. This acts on the evaluation value Eb(n) to reduce the total evaluation value Sc(i, k) in the state of the digit shift.

That is, the evaluation value Ec(m) of the character frame $20(m)$ is an indicator of whether the character string frame 24 has been set at an appropriate position. The evaluation value Ec(m) therefore functions to improve the total evaluation value Sc(i, k) at the appropriate position. In contrast, the evaluation value Eb(n) of the margin frame $50(n)$ is an indicator of whether the digit shift has occurred in the character string frame 24. The evaluation value Eb(n) functions to degrade the total evaluation value Sc(i, k) at the digit-shifted position. Consequently, the total evaluation value Sc(i, k) can more accurately evaluate the position of the character string frame 24. As long as the above setting is made, the method for calculating the evaluation values according to the present invention is not limited to the above. Any other calculation formula may be adopted.

Figure 14D:
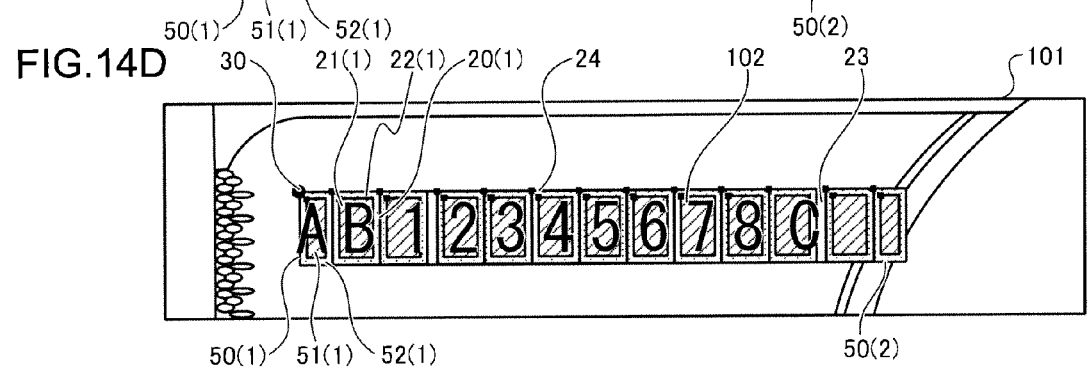
Figure 14E:
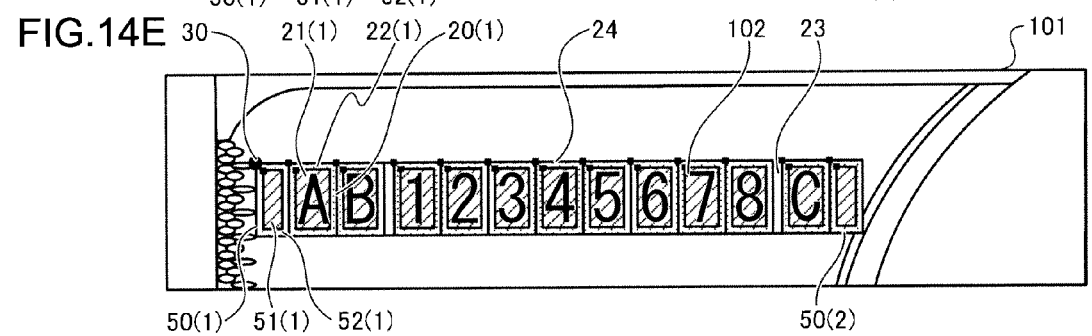

The method for calculating the evaluation value is explained in detail with reference to FIG. 14. In the digit-shifted state as shown in FIG. 14D, the leading character "A" in the serial number 102 is included in the left-most margin frame 50(1) of the character string frame 24, so that the total evaluation value Sc(i, k) is degraded in comparison with when there is no margin frame 50(n). Similarly, because there is a background pattern in the right-most margin frame 50(2) of the character string frame 24, the total evaluation value Sc(i, k) is degraded. Consequently, the total evaluation value Sc(i, k) is greater when the character string frame 24 is set at an appropriate position as shown in FIG. 14E than being set at a position in FIG. 14D. In this manner, the position of the serial number 102 can be accurately identified based on the total evaluation value Sc(i, k).

In this manner, since the margin frame 50(n) is set for evaluating the margins that are adjacent to the serial number 102 in addition to the character frame 20(m) for evaluating the characters in the serial number 102, the position of the serial number 102 can be further accurately identified. In addition to the margin frame 50(n), background frames for evaluating the background shown in any one of FIGS. 15A to 15C can be used.

Figure 15A:
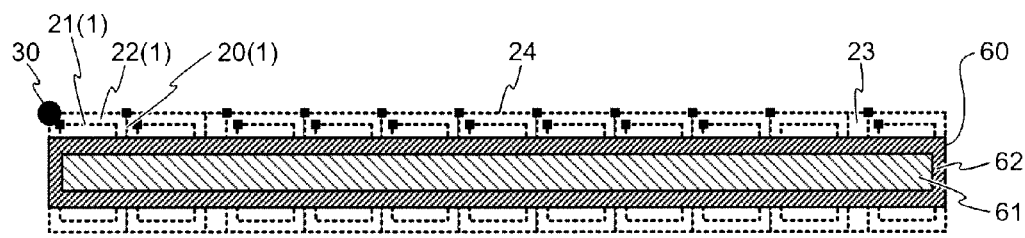
FIG. 15 is a diagram showing examples of background frames.

In the example shown in FIG. 15A, in addition to the character string frame 24 shown in FIG. 14A, a background frame (multiple-digit frame) 60 that overlaps multiple characters is set. In the example shown in FIG. 15B, in addition to the character string frame 24 shown in FIG. 14A, a background frame (top-and-bottom frame) 70 is set at each character position by dividing the character portion 21(m) into two regions, with a rim portion 72 being at the top and a character portion 71 being at the bottom.

The margin frame 50 and the background frames 60 and 70 are not alone used for evaluation, but are used in an auxiliary manner so that the accuracy of the evaluation of the character frame 20(m) can be further improved. In FIG. 15, in addition to the character frame 20(m), the background frames 60, 70, and 80 are set. In this drawing, the character frame 20(m) and the character string frame 24 are shown in broken lines to make the shapes and the positions of the background frames 60, 70, and 80 easily understood. For the sake of simplification, an expression "the background frames 60, 70, and 80" has been used, but this does not mean that a single character string frame 24 always includes all kinds of background frames (60, 70, and 80). A character string frame 24 can include multiple types of background frames or only one of those background frames.

Figure 15B:
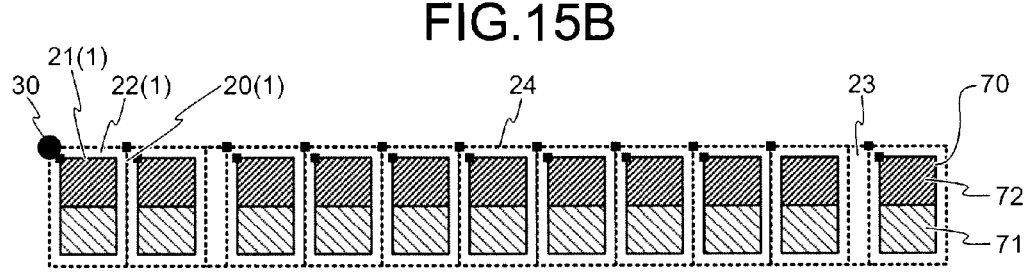

In addition to the structure of the character string frame 24 shown in FIG. 14A, the character string frame 24 in which the background frames 60 and 70 shown in FIGS. 15A and 15B are set is used when the partial region 101 contains a character string 103 (hereinafter, "non-extraction-target character string 103") other than the serial number 102, as shown in FIGS. 16A to 16D. When the character string frame 24 is at the position containing the non-extraction-target character string 103, the evaluation value is degraded by setting the background frames 60 and 70, and the non-extraction-target character string 103 can be prevented from being falsely recognized as the serial number 102.

More specifically, if the character string frame 24 contains the non-extraction-target character string 103 as shown in FIGS. 16A to 16D, there is a possibility that the evaluation value Ec(m) of each character frame 20(m) is increased at a position where the character frame 20(m) contains the non-extraction-target character string 103 instead of the serial number 102. For this reason, the background frame 60 shown in FIG. 15A is set to include part of the non-extraction-target character string 103 at the position shown in FIG. 16B. Similarly, the background frame 70 in FIG. 15B is set to include part of the non-extraction-target character string 103 at the position shown in FIG. 16D in. The method for calculating the evaluation value Eb(n) for the background frames 60 and 70 is determined such that the evaluation value at the above position takes a negative value in the same manner as the above margin frame 50(n). That is, the background frames 60 and 70 are used to degrade the total evaluation value Sc(i, k) at the position indicated in this drawing at which the position of the serial number 102 is likely to be falsely recognized due to the presence of the non-extraction-target character string 103. In comparison with a situation where the character string frame 24 contains the serial number 102 at an appropriate position, use of the background frames 60 and 70 degrades the total evaluation value Sc(i, k) at the position where the character string frame 24 contains the non-extraction-target character string 103 so that false identification of the position of the serial number 102 can be prevented.

As shown in (c) and (d) in FIG. 17, the evaluation values Eb(n) for the background frames 60 and 70 are calculated by multiplying the absolute value of the difference between the average density C of the character portion (61 and 71) and the average density F of the rim portion (62 and 72) by −1. The difference between the average density C of the character portion (61 and 71) and the average density F of the rim portion (62 and 72) increases at the positions in FIGS. 16B and 16D, in comparison with the same at the positions in FIGS. 16A and 16C. When the evaluation value Eb(n) obtained by multiplying this absolute value by −1 is added, the total evaluation value Sc(i, k) is degraded at the position shown in FIG. 16B than at the position shown in FIG. 16A, and degraded at the position shown in FIG. 16D than at the position shown in FIG. 16C.

Figure 16A:
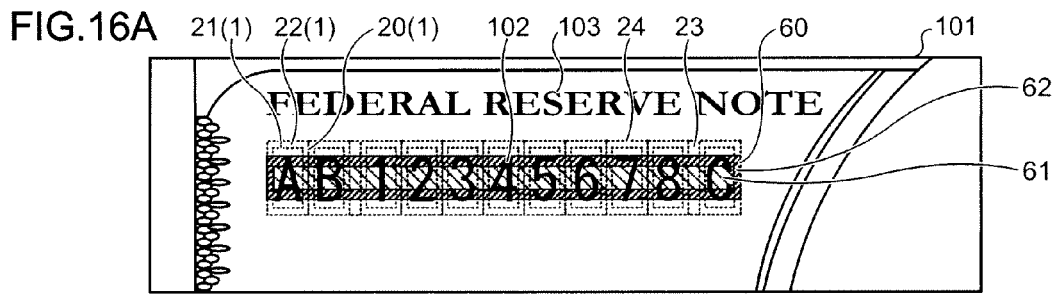
FIG. 16 is a diagram showing examples of banknote images with background frames.
Figure 16B:
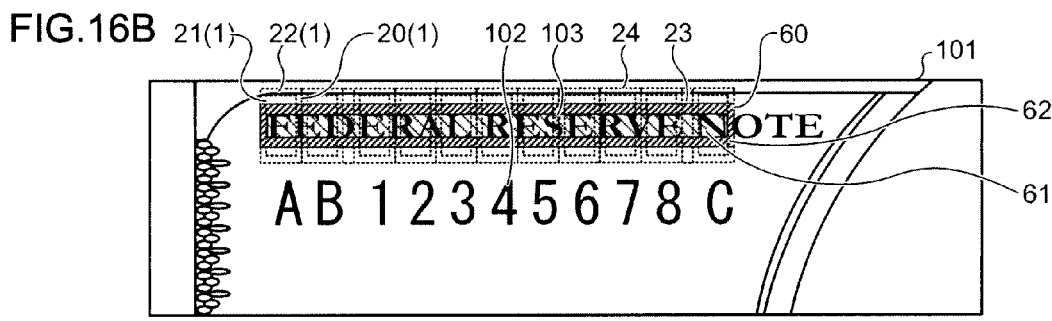
Figure 16C:
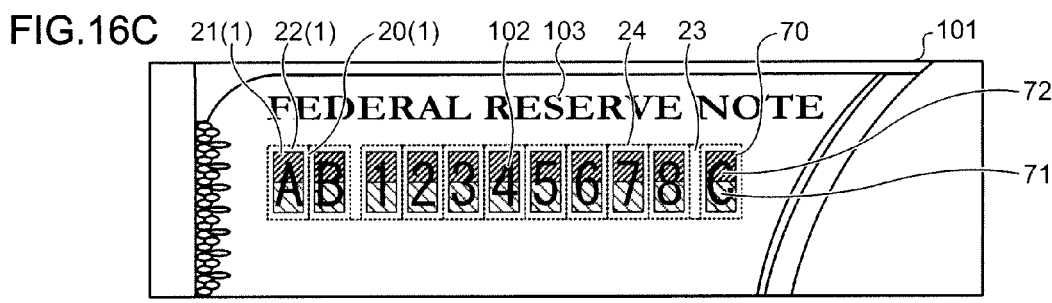
Figure 16D:
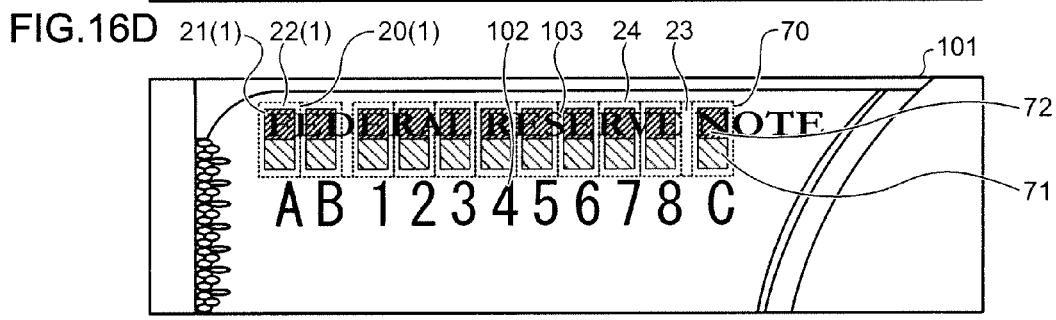

As shown in FIGS. 16A and 16C, when the character string frame 24 is set at an appropriate position with respect to the serial number 102, the absolute value of the evaluation value Eb(n) for the background frames 60 and 70 is smaller than at the position shown in FIGS. 16B and 16D. This is because the background frames 60 and 70 are set such that the difference between the average density C of pixels included in the character portions 61 and 71 of the background frames 60 and 70 and the average density F of pixels included in the rim portions 62 and 72 is greater at the positions shown in FIGS. 16B and 16D.

That is, the background frames 60 and 70 are set such that, when the character portions 21(m) are at appropriate positions and contain the serial number 102 therein, the total evaluation value Sc(i, k) of the character string frame 24 would not be significantly affected by the presence of the background frames 60 and 70. Moreover, the background frames 60 and 70 are set such that, at a position at which there is a possibility that the non-extraction-target character string 103 or the pattern in the background is falsely recognized as the position of the serial number 102, the total evaluation value Sc(i, k) is degraded. Because the background frames 60 and 70 are included in the character string frame 24 in addition to the character frame 20(m), false identification of the position of the serial number 102 can be prevented, and the position of the serial number 102 can be accurately identified.

The use of the background frames 60 and 70 is not limited to degrading of the total evaluation value Sc(i, k) as discussed above. That is, the background frames 60 and 70 can be set such that, when the character portions 21($m$) contain the serial number 102 and are at appropriate positions, the total evaluation value Sc(i, k) for the character string frame 24 can be improved.

Figure 15C:
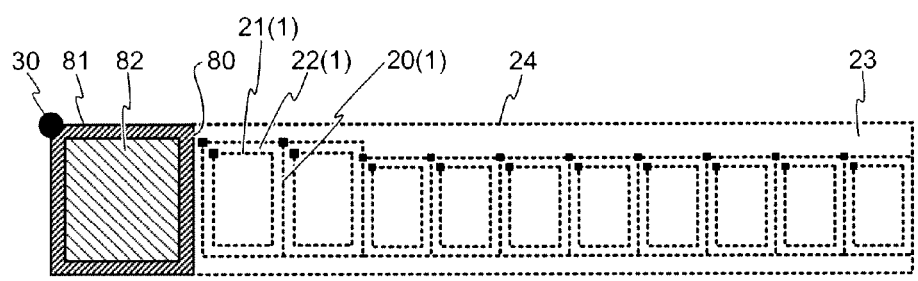

Concretely, for example as shown in FIG. 15C, in addition to the character frame 20($m$), the background frame 80 can be set at a position to serve as a clue to the identification of the position of the serial number 102 so that it can help identification of the position of the serial number 102.

In the background frames 60 and 70, in the same manner as the margin frame 50($n$), the background frame evaluation value Eb is obtained by multiplying the absolute value of the difference (F−C) between the average density C of the character portions 61 and 71 and the average density F of the rim portions 62 and 72 by −1. If any character or pattern is included in the background frames 60 and 70, the background frames 60 and 70 function to degrade the total evaluation value Sc(i, k). In the background frame 80 in FIG. 15C, however, the evaluation value Eb is determined as a difference (F−C) between the average density C of a character portion 81 and the average density F of a rim portion 82, but the difference is not multiplied by −1. The total evaluation value Sc(i, k) is obtained by adding the evaluation values Eb of the background frames 80 to the total of the evaluation values Ec(m) for the character frames 20($m$).

Figure 16E:
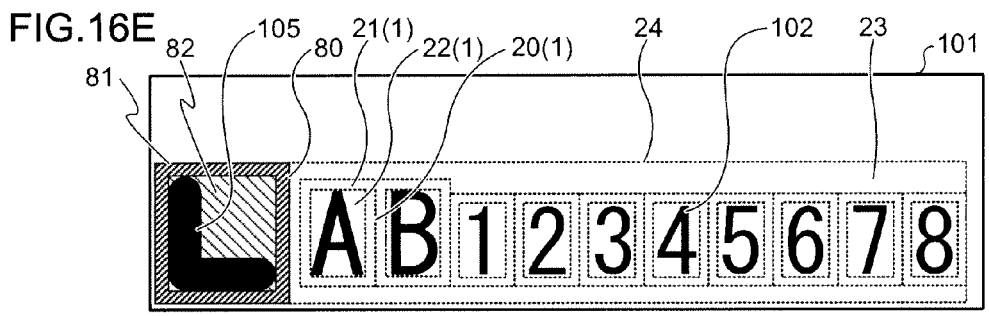

The background frame (pattern frame) 80 shown in FIG. 15C is used for recognition of the serial number 102 like the one shown in FIG. 16E. Concretely, a substantially L-shaped pattern 105 is printed on the left side of the serial number 102 on the banknote shown in this drawing. As shown in FIG. 16E, the image of this pattern 105 is also included in the image of the partial region 101. The position of the pattern 105 can be used as a clue for identifying the position of the serial number 102. The background frame 80 shown in FIG. 15C is set such that the character portions 81 of the background frame 80 includes the pattern 105 when the characters in the serial number 102 are included in the character portions 21($m$) as shown in FIG. 16E. The background frame 80 is also set such that, when the pattern 105 is fully included in the character portion 81 of the background frame 80, a value obtained by subtracting the average density C of the character portion 81 from the average density F of the rim portion 82, or in other words the evaluation value Eb of the background frame 80, reaches the maximum (see (e) in FIG. 17). The evaluation value Eb of the background frame 80 therefore functions to improve the total evaluation value Sc(i, k) when the character string frame 24 is at an appropriate position with respect to the serial number 102. Consequently, by using the background frame 80, accurate identification of the position of the serial number 102 can be facilitated.

As described above, one of the background frames 60, 70, and 80 can be used for identification of the character string frame 24, or multiple background frames can be used. When using multiple background frames, the background frame evaluation value is denoted as Eb(n) in the same manner as the evaluation value of the margin frame 50($n$). The evaluation value is referred to as the background frame evaluation value Eb(n) hereinafter.

Whether the background frame evaluation value Eb(n) is to function to improve or degrade the total evaluation value Sc(i, k) can be determined by the setting of the evaluation formula. Similarly to the character frame evaluation value Ec(m), the background frame evaluation value Eb(n) can be calculated as the difference between the average density F of the rim portions (52($n$), 62, 72, and 82) and the average density C of the character portions (51($n$), 61, 71, and 81). The calculation method is not limited thereto, however. The evaluation formula can be determined to multiply the difference of the average densities by a constant factor or to add a constant factor thereto. The evaluation formula is suitably determined in accordance with the position, the size, and the purpose of setting the background frame such as the margin frames 50($n$), the multiple-digit frame 60, the top-and-bottom frame 70, and the pattern frame 80.

Information necessary to obtain the background frame evaluation value Eb(n) by setting the margin frames 50($n$) or the background frames 60, 70, and 80 is stored in the memory 4 as the background frame information 4C as shown in FIG. 1, and is used by the character string frame evaluation value calculation unit 3C. The character frame information 4A and the background frame information 4C stored in the memory 4 includes information necessary to set and use the character frames 20($m$), the character string frame 24, the margin frames 50($n$), and the background frames 60, 70, and 80. Such information is stored in association with the denomination of the banknote, and is read from the memory 4 based on the denomination of the processing target banknote image 100. FIG. 17 is a diagram showing examples of the character frame information 4A and the background frame information 4C. The memory 4 stores therein, for example, information on the character frames 20($m$), the margin frames 50($n$), the background frames (60, 70, and 80), and the character string frame 24, and information such as the evaluation formula for calculating the evaluation value.

As explained above, the margin frame 50($n$) and the background frames 60, 70, and 80 can be used for identification of the position of the serial number 102. The identification can be thereby less affected by characters or patterns that may lead to false identification of the position of the serial number 102. The characters or patterns can also be used as a clue to identification of the position of the serial number 102. In addition to the structure of the character string frame 24 according to the first and second embodiments, the margin frames 50($n$) and the background frames 60, 70, and 80 that include the character portions (51($n$), 61, 71, and 81) and the rim portions (52($n$), 62, 72 and 82) are suitably set to evaluate the feature portions such as the character string or the pattern near or in the background of the serial number 102, and the evaluation formulae for evaluation of these frames are also suitably set. By calculating the total evaluation value Sc(i, k) by using the background frame evaluation value Eb(n), the position of the serial number 102 can be further accurately identified.

Fourth Embodiment

In the method according to the first to third embodiments, the character string frame 24 includes the character frames 20($m$) only, or the character string frame 24 that includes the character frames 20($m$) and either one of the margin frames 50($n$) and the background frame (60, 70 or 80), and the evaluation values Ec(m) and Eb(n) for each frame and the total evaluation value Sc(i, k) are calculated by using all the frames of the character string frame 24 from the beginning. The present invention, however, is not limited thereto. A method is explained in the fourth embodiment in which the evaluation is made by using some of the character frames 20($m$), the margin frames 50($n$), and the background frame (60, 70, or 80).

According to the fourth embodiment, the methods for setting the character frame 20(m) that includes the character portion 21(m) and the rim portion 22(m), setting the character string frame 24 that includes the multiple character frames 20(m), calculating the evaluation value by using the average density, extracting an image by determining the evaluation position at which the evaluation value reaches the maximum as the position of the serial number 102, dealing with displacement in printing and warping of the image by moving the character frames 20(m), and using the margin frames 50(n) and the background frames 60, 70, and 80 are the same as those of the first to third embodiments. Therefore, the explanation of these methods has been omitted.

The fourth embodiment is different from the first to third embodiments in that, before calculating the evaluation values for all the frames such as the character frames 20(m) that are included in the character string frame 24, the evaluation value is calculated by using only some of the frames, based on which the character string frame 24 that is most likely to include the serial number 102 is selected. After the processing target character string frame 24 is narrowed down, evaluation is made by using all the frames including the character frames 20(m), the margin frames 50(n), the background frames 60, 70, and 80 in the character string frame 24, in the same manner as the first to third embodiments. This difference between the fourth embodiment and the first to third embodiments is explained in detail below.

Figure 18:
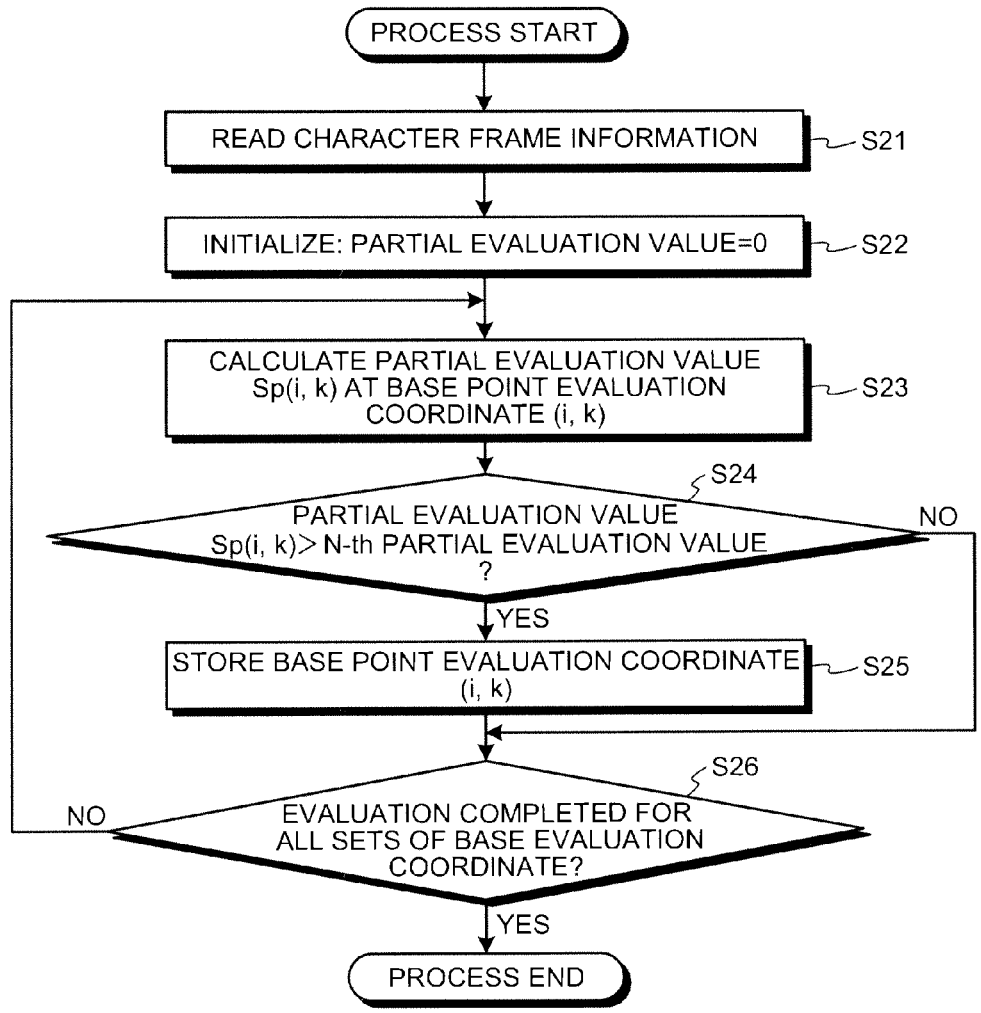
FIG. 18 is a flowchart explaining a method for increasing the processing speed by using only some of the character frames according to a fourth embodiment.
Figure 20A:
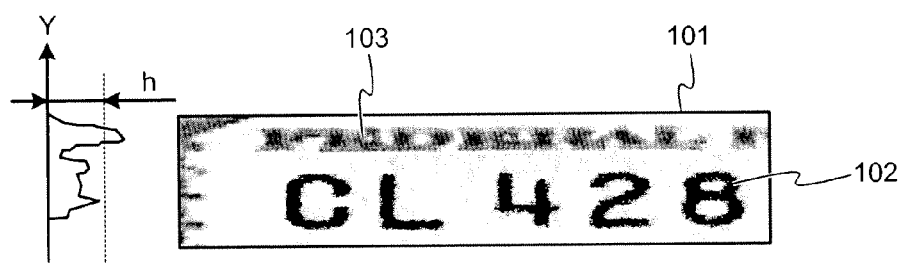
FIG. 20 is a diagram explaining an example of a conventional character string extraction method using histograms.
Figure 20B:
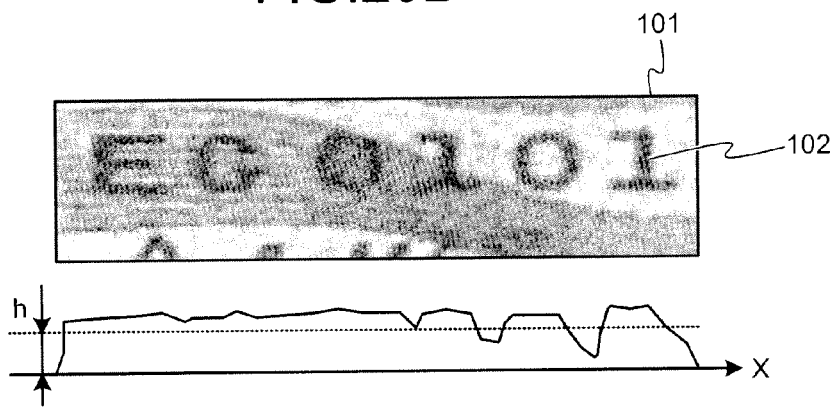

FIG. 18 is a flowchart of a process according to the fourth embodiment. After candidates of processing target character string frames 24 are selected through the process shown in FIG. 18, the process shown in FIGS. 8 and 9 are performed in a similar manner to the first to third embodiments.

First, the character frame information 4A is read from the memory 4, and the character string frame 24 including the character frames 20(m) is set in accordance with the denomination of the processing target (Step S21 in FIG. 18). If the margin frames 50(n) and/or the background frames 60, 70, and 80 are set for this denomination, the background frame information 4C is also read from the memory 4. The frames in the background frame information 4C are added as frames included in the character string frame 24. Before beginning calculation of the evaluation values, the evaluation value is initialized to 0 (zero) (Step S22). Up to this stage, the same process as that of the first to third embodiments is performed.

Next, a partial evaluation value Sp(i, k), when the base point 30 of the character string frame 24 is at the base point evaluation coordinate (i, k) on the image of the partial region 101, is calculated (Step S23). The partial evaluation value Sp(i, k) is calculated by using only some of the frames including the character frames 20(m), the margin frames 50(n), the background frames 60, 70, and 80 in the character string frame 24. More specifically, in the character string frame 24 including the character frames 20(m) and the margin frames 50(n) in example (b) in FIG. 17, frames that are to be used for calculation of the partial evaluation value Sp(i, k) are selected from the frames in the character string frame 24. The selected frames can be two right-most character frames 20(m), or the right-most character frame 20(m) and the margin frame 50(n). In the selection of the frames that are to be used, frames that are less susceptible to the non-extraction-target character string 103 that is not the serial number 102 or to background patterns or the like when identifying the position of the serial number 102 should be preferentially selected. The evaluation values Ec(m) and Eb(n) are calculated for each of the selected frames, and the partial evaluation value Sp(i, k) is calculated based on these evaluation values. This calculation uses, not all the frames such as the character frames 20(m), the background frames 50(n), the background frames 60, 70, and 80 in the character string frame 24, but only some of the frames. Consequently, the entire processing amount can be reduced, and the speed of the process can be increased.

Next, an ordinal rank of the calculated partial evaluation value Sp(i, k) in descending order among all the previously calculated partial evaluation values Sp(i, k) is judged. It is judged whether this partial evaluation value Sp(i, k) is within a predetermined number from the highest value, for example, ranked in the top N (Step S24 in FIG. 18). If the partial evaluation value Sp(i, k) is in the top N values (Yes at Step S24), the base point evaluation coordinate (i, k) of the calculated evaluation value is stored in the memory 4. If the partial evaluation value Sp(i, k) is not in the top N values, the base point evaluation coordinate (i, k) is not stored, and the control proceeds to the next process (No at Step S24).

Next, whether the evaluation of all the base point evaluation coordinates (i, k) is completed is judged (Step S26). If the evaluation of all the evaluation coordinates is completed (Yes at Step S26), the process is terminated. If there remain any evaluation coordinates that are to be evaluated (No at Step S26), the above operation (Steps S23 through S26) is repeated.

Through the above process, the base point evaluation coordinates (i, k) for which the partial evaluation values Sp(i, k) are ranked among the top N can be selected and stored in the memory 4. With these base point evaluation coordinates (i, k), it is likely that, when the character string frame 24 is set with respect to the base point 30 being at these coordinate, the characters in the serial number 102 are included in the corresponding character portions 21(m). After the candidates of base point evaluation coordinates (i, k) are selected, the same processes as those of the first to third embodiments in FIGS. 8 and 9 are performed only on these base point evaluation coordinates (i, k) as evaluation targets.

As discussed above, candidates of base point evaluation coordinates (i, k) are selected by not all but only some of the frames included in the character string frame 24 such as the character frames 20(m), the margin frames 50(n), and the background frames 60, 70, and 80, and the evaluation value is calculated only for the selected evaluation coordinates by using all the frames. The entire processing amount is thereby reduced, and the processing speed can be increased.

Furthermore, the frames less susceptible to the background pattern or the non-extraction-target character string 103 except the serial number 102 or the like are selected and evaluated from among the character frames 20(m), the margin frames 50(n), and the background frames 60, 70, and 80 included in the character string frame 24. Thereby, the candidates of base point evaluation coordinates (i, k) can thereby be efficiently narrowed down.

To achieve the high-speed processing by reducing the processing amount, the base point evaluation coordinates (i, k) for which the evaluation value are ranked in the top N are selected, as discussed above. Alternatively, the total evaluation value Sc(i, k) may be calculated only when the partial evaluation value Sp(i, k) exceeds a predetermined value.

FIG. 19 is a flowchart of a specific processing example. First, the character frame information 4A and the background frame information 4C is read from the memory 4, and the character string frame 24 that includes the character frames 20(m), the margin frames 50(n), the background frames 60, 70, and 80, and the like is set in accordance with the denomination of the processing target (Step S31). Before beginning the calculation of the evaluation value, the maximum evaluation value is initialized to 0 (zero) (Step S32).

After the partial evaluation value Sp(i, k) is calculated (Step S33), whether this evaluation value exceeds a predetermined threshold value is judged (Step S34). Only when it exceeds the threshold value (Yes at Step S34), the calculation of the total evaluation value Sc(i, k) is performed (Step S35). When the partial evaluation value Sp(i, k) is smaller than or equal to the threshold value (No at Step S34), the control proceeds to the next base point evaluation coordinate (No at Step S38). The processes are the same as those in the first to third embodiments, and also in the fourth embodiment, and the detailed explanation thereof is omitted.

As described above, the evaluation is made by using only some of the frames included in the character string frame 24 such as the character frames 20(*m*), the margin frames 50(*n*), the background frames 60, 70, and 80, and only when the evaluation value exceeds the predetermined value, the evaluation value is calculated by using all the frames. The entire processing amount can be thereby reduced, and the processing speed can be increased. Furthermore, among the frames included in the character string frame 24 such as the character frames 20(*m*), frames that are less susceptible to a character string except the serial number 102 or to the background pattern and the like are selected and evaluated. Candidates of evaluation coordinates can thereby be efficiently narrowed down.

As explained above, according to the first to fourth embodiments, the multiple character frames 20(*m*) are set up to include the characters in the serial number 102. The evaluation values, which evaluate inclusion of the serial number 102 in the character frames 20(*m*), are used, and the evaluation values are compared relative to one another while moving the character frame 20(*m*) on the banknote image. The position of the serial number 102 is thereby identified. Consequently, even when a character is printed near the serial number 102, or when there is a pattern or a design in the background of the serial number 102, the position of the serial number 102 can be accurately identified. The image of the serial number 102 or of each character in the serial number 102 can thereby be accurately extracted. The character frame 20(*m*) is divided into the character portion 21(*m*) that includes the characters and the rim portion 22(*m*) that surrounds the character portion 21(*m*), and the evaluation formula is set such that, by using the feature values such as the pixel values that show difference between the characters and the surrounding of the characters, the evaluation value is increased when a character is included in the character portion 21(*m*). The position of each character therefore can be accurately identified. Furthermore, the position of the serial number 102 is identified based on the character string frame 24 that includes the multiple character frames 20(*m*). Even when a character string that is not the serial number is printed near some character in the serial number 102 or when there is a background pattern, the position at which the character frame 20(*m*) is to be brought over the serial number 102 can be accurately identified.

Each character frame 20(*m*) is moved pixel by pixel from the position determined for the character string frame 24 and is evaluated. Even when the positions of the characters in the serial number 102 are displaced on the image due to the displacement in printing or the warping of the banknote image, the positions of the characters in the serial number 102 can be accurately identified.

The margin frames 50(*n*) and the background frames 60, 70, and 80 are also set for evaluation of not only the serial number 102 but also of features surrounding the serial number 102 and of any character string other than the serial number. With these frames, the evaluation formula is set such that the evaluation value can be degraded at a position where there is a possibility of false identification as the position of the serial number 102, or that the evaluation value can be increased at a position where the position of the serial number 102 is accurately recognized. Consequently, even when there is a character string other than the serial number or when there is a design or a pattern in the background, the identification is less affected by these factors, and the position at which the character frame 20(*m*) is to be brought over the serial number 102 can be accurately identified.

Among the character frames 20(*m*), the margin frames 50(*n*), the background frames 60, 70, and 80 in the character string frame 24, only some of the frames are used for the evaluation. Target evaluation positions are thereby narrowed down, and then all the frames including the character frames 20(*m*) are used for the evaluation. Consequently, the position of the serial number 102 can be accurately identified, while the entire processing amount is reduced and the high-speed processing can be realized. Furthermore, the evaluation is made by using some of the frames included in the character frame 20(*m*), and then the evaluation is made by using all the frames including the character frames 20(*m*) only when the evaluation value exceeds the predetermined threshold value. Consequently, the entire processing amount is reduced, and the high-speed processing can be realized.

The processes explained in the first to fourth embodiments can be individually performed, or selected processes or all the processes can be suitably combined. The above processes are applicable to any serial numbers printed not only on banknotes but also on paper sheets such as checks, drafts, and gift coupons to attain the same effects.

INDUSTRIAL APPLICABILITY

The character string extraction method and the character string extraction device according to the present invention are useful when positions of characters in a character string are to be identified for character recognition of a serial number printed on a paper sheet, by using an image obtained by scanning the paper sheet.

EXPLANATIONS OF LETTERS OR NUMERALS

1: Scanner
2: Denomination recognition unit
3: Control unit
3A: Skew correction unit
3B: Partial region extraction unit
3C: Character string frame evaluation value calculation unit
3D: Character position determining unit
4: Memory
4A: Character frame information
4B: Character string information
4C: Background frame information
5: Character recognition unit
10: Character string extraction device
20(*m*): Character frame
21(*m*), 51(*n*), 61, 71, 81: Character portion
22(*m*), 52(*n*), 62, 72, 82: Rim portion
23: Spacing region
24: Character string frame
30: Base point
50(*n*): Margin frame
60, 70, 80: Background frame
100: Banknote image
101: Partial region
102: Serial number
103: Character string

The invention claimed is:

1. A character string extraction method in which a character frame is set on a paper sheet image obtained by capturing a paper sheet on which a character string is printed or typed, and an image of the character string is extracted therefrom, the character string extraction method comprising:
    setting a plurality of character portions for the character string, each character portion is a region including at least one individual character of the character string;
    setting a rim portion that is a surrounding region adjacent to and around the character portion;
    setting a character frame that is a combination of the character portion and the rim portion;
    setting a character string frame that includes all the character frames for the character string;
    calculating feature values of each image in the character portion and the rim portion for each character frame;
    calculating a character string frame evaluation value based on the feature values for the character string frame;
    moving a position of the character string frame on the paper sheet image; and
    extracting an image in the character portion by using the character string frame at a position at which the character string frame evaluation value reaches a maximum.

2. The character string extraction method according to claim 1, wherein the character string frame is set in accordance with a type of the paper sheet.

3. The character string extraction method according to claim 1, wherein the feature values are average densities of all pixels in each portion.

4. The character string extraction method according to claim 1, wherein
    when setting the character string frame, the character portion and the rim portion are set not only for the characters in the character string but also for a margin portion out of the character string, the margin portion is adjacent to the character string, and
    the method further comprises calculating an evaluation value, wherein a value based on feature values of the character portion and the rim portion that are set in the margin portion is subtracted from the character string frame evaluation value, and the calculated evaluation value is adopted as the character string frame evaluation value.

5. The character string extraction method according to claim 1, wherein
    when setting the character string frame, the character portion and the rim portion are set not only for the characters in the character string but also for a non-extraction-target character that is printed on the paper sheet, and
    the method further comprises calculating an evaluation value, wherein a value based on feature values of the character portion and the rim portion that are set in the non-extraction-target character is subtracted from the character string frame evaluation value, and the calculated evaluation value is adopted as the character string frame evaluation value.

6. The character string extraction method according to claim 1, wherein
    when setting the character string frame, the character portion and the rim portion are set not only for the characters in the character string but also for a non-extraction-target character or a pattern printed on the paper sheet in a predetermined positional relationship with the character string, and
    the method further comprises calculating an evaluation value, wherein a value based on feature values of the character portion and the rim portion that are set for the non-extraction-target character or the pattern is added to the character string frame evaluation value, and the calculated evaluation value is adopted as the character string frame evaluation value.

7. The character string extraction method according to claim 4, wherein
    when extracting the image, an image in the character portion set for the margin portion is not extracted.

8. The character string extraction method according to claim 1, further comprising:
    calculating feature values where the character portion and the rim portion are moved in a predetermined direction with respect to the character string frame for a predetermined number of pixels, while fixing the position of the character string frame set on the paper sheet image; and,
    wherein if the character string frame is fixed at the position and the character string frame evaluation value after moving the character portion and the rim portion is greater than the character string frame evaluation value before the moving, the character string frame evaluation value after the moving is adopted as the character string frame evaluation value, and
    when extracting the image, an image in the character portion after the moving is determined as an extraction target.

9. The character string extraction method according to claim 1, further comprising:
    a first partial evaluation process in which all steps except the step for extracting the image are performed with focusing some of the character frames included in the character string frame, and the feature value and the character string frame evaluation value are calculated; and
    wherein the steps for calculating the feature value and the evaluation value, and for extracting the image are performed with all the character frames only at the position of the character string frame for which the character string frame evaluation value calculated in the first partial evaluation process is ranked among a predetermined number of character string frame evaluation values from the maximum.

10. The character string extraction method according to claim 1, further comprising:
    a second partial evaluation process in which the feature value and the character string frame evaluation value are calculated with focusing some of the character frames included in the character string frame; and,
    wherein the steps for calculating the feature value and the evaluation value, and for extracting the image are performed with focusing all the character frames only at the position of the character string frame for which the character string frame evaluation value calculated in the second partial evaluation process exceeds a predetermined threshold value.

11. A character string extraction device that receives a paper sheet image obtained by capturing a paper sheet on which a character string is printed or typed, sets a character string frame thereon, and thereby extracts an image of the character string, the character string extraction device comprising:
    a skew correction unit that corrects a skew of the paper sheet image when the paper sheet image is skewed;
    a partial region extraction unit that extracts a region that includes the character string from the paper sheet image or the paper sheet image corrected by the skew correction unit;

an evaluation value calculation unit that
- sets a region that includes at least one individual character of the character string as a character portion of a plurality of character portions for the character string,
- sets a surrounding region adjacent to and around the character portion as a rim portion,
- sets the character portion combined with the rim portion as a character frame,
- sets a region including all the character frames for the character string as a character string frame,
- calculates feature values of each image in the character portion and the rim portion while moving a position of the character string frame, and
- calculates a character string frame evaluation value based on the feature values of the rim portion and the character portion calculated at different positions; and a character position determining unit that determines, as a region for extracting an image, the character portion of the character string frame for which the character string frame evaluation value reaches a maximum.

12. The character string extraction method according to claim 6, wherein
when extracting the image, an image in the character portion set for the non-extraction-target character or the pattern is not extracted.

* * * * *